United States Patent
Lu et al.

(10) Patent No.: US 11,028,187 B2
(45) Date of Patent: *Jun. 8, 2021

(54) DETERGENT COMPOSITIONS

(71) Applicant: NUTRITION & BIOSCIENCES USA 4, INC., Rochester, NY (US)

(72) Inventors: Helen S M Lu, Wallingford, PA (US); Weiming Qiu, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 16/308,029

(22) PCT Filed: Jun. 12, 2017

(86) PCT No.: PCT/US2017/036977
§ 371 (c)(1),
(2) Date: Dec. 7, 2018

(87) PCT Pub. No.: WO2017/218391
PCT Pub. Date: Dec. 21, 2017

(65) Prior Publication Data
US 2019/0309096 A1  Oct. 10, 2019

Related U.S. Application Data

(60) Provisional application No. 62/349,176, filed on Jun. 13, 2016.

(51) Int. Cl.
*C11D 3/22* (2006.01)
*C08B 37/00* (2006.01)
*C11D 3/386* (2006.01)

(52) U.S. Cl.
CPC .......... *C08B 37/0009* (2013.01); *C11D 3/225* (2013.01); *C11D 3/227* (2013.01); *C11D 3/386* (2013.01)

(58) Field of Classification Search
CPC .......... C11D 3/22; C11D 3/225; C11D 3/227; C08B 37/00; C08B 37/0009
See application file for complete search history.

(56) References Cited

U.S. PATENT DOCUMENTS

| | | | |
|---|---|---|---|
| 6,346,616 | B1 | 2/2002 | Duval |
| 7,000,000 | B1 | 2/2006 | O'Brien |
| 8,642,757 | B2 | 2/2014 | O'Brien et al. |
| 9,080,195 | B2 | 7/2015 | O'Brien et al. |
| 9,139,718 | B2* | 9/2015 | Paullin .......... C08L 5/00 |
| 9,695,253 | B2* | 7/2017 | Nambiar .......... C11D 3/28 |
| 2009/0082248 | A1 | 3/2009 | Jones |
| 2013/0244288 | A1 | 9/2013 | O'Brien et al. |
| 2014/0179913 | A1* | 6/2014 | Paullin ........ C08B 37/0009 536/120 |
| 2015/0259439 | A1* | 9/2015 | Nambiar ........ C11D 3/0036 510/299 |
| 2018/0282385 | A1 | 10/2018 | Cheng et al. |

FOREIGN PATENT DOCUMENTS

| | | |
|---|---|---|
| WO | 2011/131412 A1 | 10/2011 |
| WO | 2013158992 A1 | 10/2013 |
| WO | 2014099724 A1 | 6/2014 |
| WO | 2015/095358 A1 | 6/2015 |
| WO | 2015138283 A1 | 9/2015 |
| WO | 2015/183714 A1 | 12/2015 |
| WO | 2015/183722 A1 | 12/2015 |
| WO | 2015/183729 A1 | 12/2015 |
| WO | 2015183721 A1 | 12/2015 |

OTHER PUBLICATIONS

Schmidt et al., Green Chem., 2014, vol. 16, pp. 1941-1946, Dec. 2, 2013.
PCT International Preliminary Report on Patentability; PCT/US17/36977, dated Dec. 18, 2018.
Patel et al., Holzforschung 64:549-554, Jul. 8, 2010.
Hage et al., Nature, vol. 369, pp. 637-639, Jun. 23, 1994.

* cited by examiner

*Primary Examiner* — Brian P Mruk

(57) ABSTRACT

The disclosure relates to compositions comprising a poly alpha-1,3-glucan derivative. The poly alpha-1,3-glucan derivative is a poly alpha-1,3-glucan polymer wherein the polymer is substituted with at least one polyether group and/or polyamine group. Compositions comprising the poly alpha-1,3-glucan derivative are useful as detergent compositions.

19 Claims, No Drawings

DETERGENT COMPOSITIONS

CROSS-REFERENCE TO RELATED APPLICATIONS

This application is the National Stage application of International Application No. PCT/US2017/036977 (filed Jun. 12, 2017), which claims the benefit of priority of U.S. Provisional Application No. 62/349,176 (filed Jun. 13, 2016), the disclosures of which prior applications are incorporated herein by reference in their entirety.

FIELD OF THE DISCLOSURE

The present disclosure is directed towards a composition comprising a poly alpha-1,3-glucan derivative, wherein the poly alpha-1,3-glucan derivative can comprise one or more polyether groups, one or more polyamine groups, or a combination of polyether and polyamine groups.

BACKGROUND OF THE DISCLOSURE

Driven by a desire to find new structural polysaccharides using enzymatic syntheses or genetic engineering of microorganisms, researchers have discovered oligosaccharides and polysaccharides that are biodegradable and can be made economically from renewably sourced feedstocks.

Modern detergent compositions, including laundry, fabric, dishwashing or other cleaning compositions comprise common detergent ingredients such as anionic, nonionic, cationic, amypholytic, zwitterionic, and/or semi-polar surfactants; as well as enzymes such proteases, cellulases, lipases, amylases, and/or peroxidases. Laundry detergent and/or fabric care compositions may further comprise various detergent ingredients having one or more purposes in obtaining fabrics which are not only clean, fresh and sanitized but also have retained appearance and integrity. Therefore, benefit agents such as perfumes, hygiene agents, insect control agents, bleaching agents, fabric softeners, dye fixatives, soil release agents, and fabric brightening agents have been incorporated into laundry detergent and/or fabric care compositions. In using such detergent components, it is important that some of these compounds deposit on the fabrics so as to be effective during or after the laundering and/or fabric care process.

Many of the ingredients that form a part of a detergent composition are produced from non-renewable petroleum feedstocks, and there remains a need to formulate detergent compositions providing improved cleaning performance that are made from renewable resources.

SUMMARY OF THE DISCLOSURE

The present disclosure relates to a composition comprising a poly alpha-1,3-glucan derivative wherein the poly alpha-1,3-glucan derivative comprises poly alpha-1,3-glucan substituted with:
a) one or more polyamine groups;
b) one or more polyether groups; or
c) a combination of a) and b).

The present disclosure also relates to a method of treating a substrate comprising contacting the substrate with the composition.

DETAILED DESCRIPTION OF THE DISCLOSURE

The disclosures of all cited patent and non-patent literature are incorporated herein by reference in their entirety.

As used herein, the term "embodiment" or "disclosure" is not meant to be limiting, but applies generally to any of the embodiments defined in the claims or described herein. These terms are used interchangeably herein.

Unless otherwise disclosed, the terms "a" and "an" as used herein are intended to encompass one or more (i.e., at least one) of a referenced feature.

When an amount, concentration, value or parameter is given as either a range or a list of upper values and lower values, this is to be understood as specifically disclosing all ranges formed from any pair of any upper range limit and any lower range limit, regardless of whether ranges are separately disclosed. For example, when a range of "1 to 5" is recited, the recited range should be construed as including any single value within the range or as any values encompassed between the ranges, for example, "1 to 4", "1 to 3", "1 to 2", "1 to 2 & 4-5", "1 to 3 & 5". Where a range of numerical values is recited herein, unless otherwise stated, the range is intended to include the endpoints thereof, and all integers and fractions within the range.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination. In addition, references to the singular may also include the plural (for example, "a" and "an" may refer to one or more) unless the context specifically states otherwise.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

The term "poly alpha-1,3-glucan" means a polymer comprising glucose monomeric units linked together by glycosidic linkages, wherein at least about 50% of the glycosidic linkages are alpha-1,3-glycosidic linkages. Poly alpha-1,3-glucan is a type of polysaccharide. The alpha-1,3-glycosodic linkage of the poly alpha-1,3-glucan can be illustrated as follows:

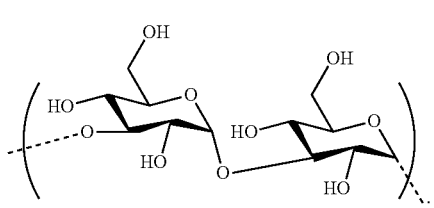

Structure 1

The poly alpha-1,3-glucan can be prepared using chemical methods. Alternatively, it can be prepared by extracting it from various organisms, such as fungi, that produce poly alpha-1,3-glucan.

Alternatively, poly alpha-1,3-glucan can be enzymatically produced from sucrose using one or more glucosyltransferase (gtf) enzymes (e.g., gtfJ), such as described in U.S. Pat. Nos. 7,000,000; 8,642,757; and 9,080,195 (the entirety of which are incorporated herein by reference), for example. Typically, the poly alpha-1,3-glucans produced according to the methods above, produce polymers having a number average degree of polymerization greater than or equal to 30. In order to produce lower molecular weight poly alpha-1, 3-glucan polymers, in can be necessary to add a mutanase. WO2015/183721, which is incorporated herein in its entirety by reference, describes the use of mutanases in order to limit the molecular weight of the polyalhap-1,3-glucans to less than about 5000 Daltons, which corresponds to approximately 30-31 glucose repeat units. Therefore, poly alpha-1, 3-glucan polymers made according to WO 2015/183721 can have an average degree of polymerization from about 4 to 30. Polymerization processes that exclude the mutanases, can produce poly alpha-1,3-glucan polymers having an average degree of polymerization of greater that about 30.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose".

The term "poly alpha-1,3-glucan derivative" means a poly alpha-1,3-glucan compound shown above, with substituents according to Structure 2, below (for the purpose of clarity, the stereochemistry of the 1,3-linked glucose monomer unit is not shown), wherein at least one of the substituents is a polyamine and/or a polyether. In some embodiments, at least one polyamine group is terminated with one or more polyether groups. Additionally, the poly alpha-1,3-glucan may have relatively low percentages of glucose monomers that are linked at the 1,2-, 1,4- and/or 1,6-positions. For glucose monomers that are 1,2- or 1,4-linked, the carbon atoms at the 2-, 3- or 4-positions would each independently be substituted with —OR as defined below and the carbon atom at the 6-position would be defined by $R^2$. For glucose monomers that are 1,6-linked, if present, the carbon atoms at the 2-, 3-, or 4-positions would each independently be substituted with —OR.

Structure 2

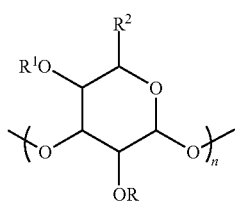

Disclosed herein are compositions comprising a poly alpha-1,3-glucan derivative wherein the poly alpha-1,3-glucan derivative comprises poly alpha-1,3-glucan comprising at least one repeat unit selected from those represented by Structure 2;

wherein each R and $R^1$ is independently hydrogen, —$R^7$—C(O)$NR^3R^4$, —$R^7$—$NR^3R^4$, —$R^7$—C(NOH)$NR^3R^4$, —$R^7$—CN, —$R^7$—C(O)$OR^8$, —C(O)$OR^8$, —C(O)$NR^3R^4$, or ($R^7$O)$_x$H;

each $R^2$ is independently —$CH_2OH$, —$CH_2O$—$R^7$—C(O)$NR^3R^4$, —$CH_2O$—$R^7$—$NR^3R^4$, —$CH_2O$—$R^7$—C(NOH)$NR^3R^4$, —$CH_2O$—$R^7$—CN, —$CH_2O$—$R^7$—$CO_2R^8$, —$CH_2NR^3R^4$, —$CH_2OC(O)OR^8$, —$CO_2R^9$, —C(O)$NR^3R^4$, —$CH_2O(R^7O)_xH$, or —$CH_2OC(O)NR^3R^4$;

each $R^3$ or $R^4$ is independently hydrogen, $C_1$ to $C_{12}$ alkyl, (—$R^7O$—)$_x$H, a polyamine, or (—$R^7$—$NR^5$)$_q R^6$;

each $R^5$ or $R^6$ is independently hydrogen, $R^8$, or (—$R^7O$—)$_x$H;

each $R^7$ is independently a $C_1$ to $C_{12}$ alkylene, optionally substituted with hydroxyl;

$R^8$ is independently hydrogen, a $C_1$ to $C_{12}$ alkyl, or a cation;

$R^9$ is hydrogen, a $C_1$ to $C_{12}$ alkyl, (—$R^7O$—)$_x$H, or a cation;

n is 4 to 500;

each x is independently 2 to 100;

each q is independently 0 to 12;

and wherein the poly alpha-1,3-glucan of Structure 2 comprises a) at least one polyamine, b) at least one polyether (—$R^7O$—)$_x$H or c) a combination of a) and b); and wherein the polyamine is a linear polyamine, a branched polyamine, or a dendritic polyamine. In other embodiments, n is greater than 30 to 500 or 35 to 500 or 40 to 500.

In one embodiment, each x is independently 2 to 100. In some embodiments, each x is independently 2 to 90, or 2 to 80, or 2 to 70, or 2 to 60, or 2 to 50, or 2 to 40, or 2 to 30, or 2 to 20. In one embodiment, each q is independently 0 to 12. In some embodiments, each q is independently 1 to 12, or 1 to 10, or 3 to 12. In some embodiments, q is 0.

Each $R^7$ group of the (—$R^7O$—)$_x$H polyether group can be chosen independently of each other. This means, for example, that each —$R^7O$— repeat unit can be the same or different. In some embodiments, each $R^7$ can be —$CH_2CH_2$—. In some embodiments, each $R^7$ can be —$CH_2CH(CH_3)$—. In other embodiments, $R^7$ can be a combination of —$CH_2CH_2$— and —$CH_2CH(CH_3)$— in a random configuration or in a block configuration. In some embodiments, the polyether groups have a repeat unit according to (—$CH_2CH_2O$—). In some embodiments, the polyether groups have a repeat unit according to (—$CH_2CH(CH_3)O$—). In some embodiments, the polyether group has a repeat unit according to (—$CH_2CH_2O$—), (—$CH_2CH(CH_3)O$—), or a combination thereof. In some embodiments, the polyether contains both (—$CH_2CH_2O$—) and (—$CH_2CH(CH_3)O$—) groups.

Each $R^7$ group of the (—$R^7$—$NR^5$)$_q R^6$ polyamine group can be chosen independently of each other. This means, for example, that each —$R^7$—$NR^5$-repeat unit can be the same or different. In some embodiments, each $R^7$ can be —$CH_2CH_2$—. In other embodiments, $R^7$ can be a combination of —$CH_2CH_2$— and —$CH_2CH(CH_3)$— in a random configuration or in a block configuration. In some embodiments, the polyamine groups have a repeat unit according to (($CH_2$)$_y$NH), wherein y is from 2 to 6 inclusive. Furthermore, one or more of the amine groups can be quaternized to produce quaternary amine groups, for example as disclosed in published patent application WO 2015/095358. The percentage of amine groups that are quaternized can be up to 100%.

The term "alkyl", used either alone or in compound words such as "alkylthio" or "haloalkyl" includes straight chain, branched, cyclic alkyl, or a combination thereof, such as, for example, methyl, ethyl, n-propyl, i-propyl, or the different butyl, pentyl or hexyl isomers. The straight-chain alkyl can have in the range of from 1 to 12 carbon atoms, while the branched and cyclic alkyl chain alkyl groups can have in the range of from 3 to 12 carbon atoms. The term "alkylene", as used herein, refers to straight chain, branched, or cyclic radicals which are chemically bonded to other moieties through the carbon atoms at each end of the alkylene group, and includes saturated and unsaturated radicals.

The term "polyamine group" means a linear organic radical having more than one amino functional group and containing in the range of from 1 to 10, or from 1 to 12, repeat units, or a branched or dendritic organic radical having more than one amino group and containing in the range of from 3 to 12 repeat units. As used herein, "dendritic" means having a tree-like hyper-branched form. The dendritic polyamine group can have arms that are equal or unequal in length. In some embodiments of the polyamine group, the structure is terminated with —$NR^3R^4$. In some embodiments of the polyamine group, the structure is terminated with —$NR^5R^6$. As examples, the polyamine groups represented by Structures 3a, 3b, 3c, 3d, 3e, 3f, 3g, and 3h are contemplated, and are shown as radicals with the attachment point to the poly alpha-1,3-glucan indicated by an asterisk *:

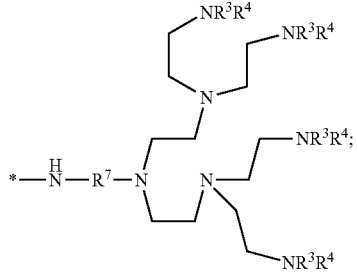

Structure 3a

Structure 3b

Structure 3c

Structure 3d

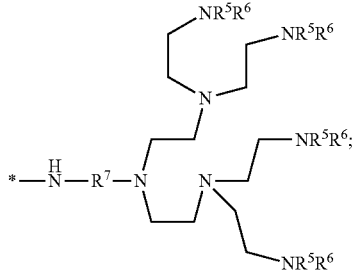

Structure 3e

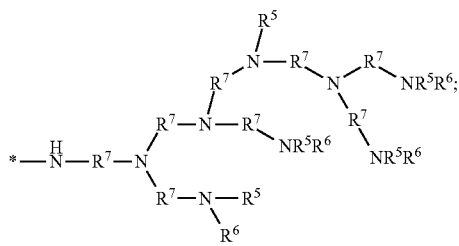

Structure 3f

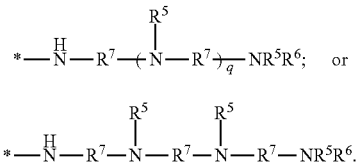

Structure 3g

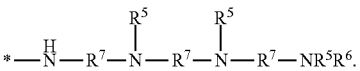

Structure 3h

In one embodiment of the composition comprising a poly alpha-1,3-glucan derivative, the one or more polyamine groups comprise a radical represented by Structure 3a:

Structure 3a wherein each $R^3$ or $R^4$ is independently hydrogen, $C_1$ to $C_{12}$ alkyl, (—$R^7O$—)$_x$H, a polyamine, or (—$R^7$—$NR^5$)$_q R^6$;

each $R^5$ or $R^6$ is independently hydrogen, $R^8$, or (—$R^7O$—)$_x$H;

each $R^7$ is independently a $C_1$ to $C_{12}$ alkylene, optionally substituted with hydroxyl;

$R^8$ is independently hydrogen, a $C_1$ to $C_{12}$ alkyl, or a cation;

each x is independently 2 to 100; and each q is independently 0 to 12. In another embodiment, q is 1 to 12. In yet another embodiment, q is 0.

In one embodiment of the composition comprising a poly alpha-1,3-glucan derivative, the one or more polyamine groups comprise a radical represented by Structure 3b:

Structure 3b

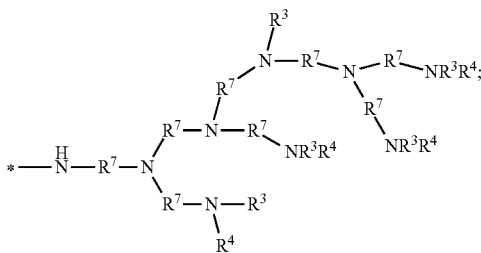

wherein
each $R^3$ or $R^4$ is independently hydrogen, $C_1$ to $C_{12}$ alkyl, $(—R^7O—)_xH$, a polyamine, or $(—R^7—NR^5)_qR^6$;
each $R^5$ or $R^6$ is independently hydrogen, $R^8$, or $(—R^7O—)_xH$;
each $R^7$ is independently a $C_1$ to $C_{12}$ alkylene, optionally substituted with hydroxyl;
$R^8$ is independently hydrogen, a $C_1$ to $C_{12}$ alkyl, or a cation;
each x is independently 2 to 100; and
each q is independently 0 to 12. In another embodiment, q is 1 to 12. In yet another embodiment, q is 0.

In one embodiment of the composition comprising a poly alpha-1,3-glucan derivative, the one or more polyamine groups comprise a radical represented by Structure 3c:

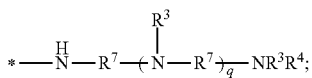

Structure 3c wherein
each $R^3$ or $R^4$ is independently hydrogen, $C_1$ to $C_{12}$ alkyl, $(—R^7O—)_xH$, a polyamine, or $(—R^7—NR^5)_qR^6$;
each $R^5$ or $R^6$ is independently hydrogen, $R^8$, or $(—R^7O—)_xH$;
each $R^7$ is independently a $C_1$ to $C_{12}$ alkylene, optionally substituted with hydroxyl;
$R^8$ is independently hydrogen, a $C_1$ to $C_{12}$ alkyl, or a cation;
each x is independently 2 to 100; and
each q is independently 0 to 12. In another embodiment, q is 1 to 12. In yet another embodiment, q is 0.

In one embodiment of the composition comprising a poly alpha-1,3-glucan derivative, the one or more polyamine groups comprise a radical represented by Structure 3d:

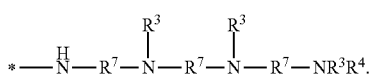

Structure 3d wherein
each $R^3$ or $R^4$ is independently hydrogen, $C_1$ to $C_{12}$ alkyl, $(—R^7O—)_xH$, a polyamine, or $(—R^7—NR^5)_qR^6$;
each $R^5$ or $R^6$ is independently hydrogen, $R^8$, or $(—R^7O—)_xH$;
each $R^7$ is independently a $C_1$ to $C_{12}$ alkylene, optionally substituted with hydroxyl;
$R^8$ is independently hydrogen, a $C_1$ to $C_{12}$ alkyl, or a cation;

each x is independently 2 to 100; and
each q is independently 0 to 12. In another embodiment, q is 1 to 12. In yet another embodiment, q is 0.

In one embodiment of the composition comprising a poly alpha-1,3-glucan derivative, the one or more polyamine groups comprise a radical represented by Structure 3e:

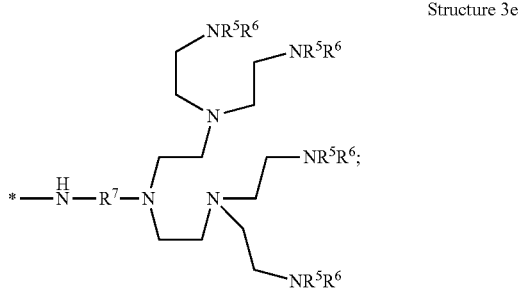

Structure 3e wherein
each $R^5$ or $R^6$ is independently hydrogen, $R^8$, or $(—R^7O—)_xH$;
each $R^7$ is independently a $C_1$ to $C_{12}$ alkylene, optionally substituted with hydroxyl;
each $R^8$ is independently hydrogen, $C_1$ to $C_{12}$ alkyl, or a cation; and
each x is independently 2 to 100.

In one embodiment of the composition comprising a poly alpha-1,3-glucan derivative, the one or more polyamine groups comprise a radical represented by Structure 3f:

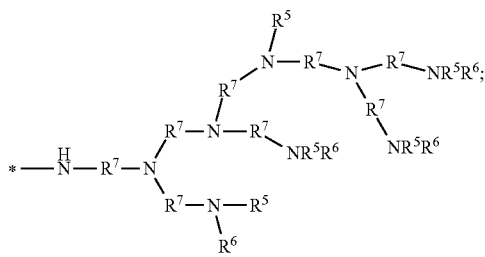

Structure 3f wherein
each $R^5$ or $R^6$ is independently hydrogen, $R^8$, or $(—R^7O—)_xH$;
each $R^7$ is independently a $C_1$ to $C_{12}$ alkylene, optionally substituted with hydroxyl;
each $R^8$ is independently hydrogen, $C_1$ to $C_{12}$ alkyl, or a cation; and
each x is independently 2 to 100.

In one embodiment of the composition comprising a poly alpha-1,3-glucan derivative, the one or more polyamine groups comprise a radical represented by Structure 3g:

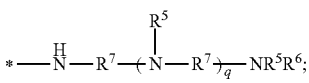

Structure 3g wherein
each $R^5$ or $R^6$ is independently hydrogen, $R^8$, or $(—R^7O—)_xH$;

each $R^7$ is independently a $C_1$ to $C_{12}$ alkylene, optionally substituted with hydroxyl;

each $R^8$ is independently hydrogen, $C_1$ to $C_{12}$ alkyl, or a cation;

each x is independently 2 to 100; and each q is independently 0 to 12.

In one embodiment of the composition comprising a poly alpha-1,3-glucan derivative, the one or more polyamine groups comprise a radical represented by Structure 3h:

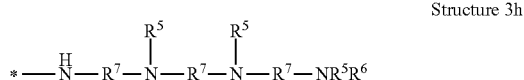

Structure 3h wherein each $R^5$ or $R^6$ is independently hydrogen, $R^8$, or $(-R^7O-)_xH$;

each $R^7$ is independently a $C_1$ to $C_{12}$ alkylene, optionally substituted with hydroxyl;

each $R^8$ is independently hydrogen, $C_1$ to $C_{12}$ alkyl, or a cation; and each x is independently 2 to 100.

The term "cation" means an ion carrying a positive charge. The cation can be an inorganic cation, for example, a cation of any one of the alkali metals Li, Na, K, Rb, Cs; a cation of any one of the alkali earth metals Be, Mg, Ca, Ba, Sr; a cation of any one of the transition metals; or an organic cation, for example, an ammonium ion, ammonium ($NH_4^+$), tetraalkyl ammonium cations, or a combination thereof. In one embodiment, the cation is a cation of Li, Na, K, Rb, Cs, or a combination thereof. In another embodiment, the cation is a cation of Be, Mg, Ca, Ba, Sr, or a combination thereof. In yet another embodiment, the cation is a cation of any one of the transition metals, or a combination thereof. In a further embodiment, the cation is an ammonium ion, ammonium, a tetraalkyl ammonium cation, or a combination thereof. In one embodiment, the cation is ammonium. In another embodiment, the cation is a tetraalkyl ammonium cation.

As used herein, the term "effective amount" will refer to the amount of the substance used or administered that is suitable to achieve the desired effect. The effective amount of material may vary depending upon the application. One of skill in the art will typically be able to determine an effective amount for a particular application or subject without undo experimentation.

The term "resistance to enzymatic hydrolysis" will refer to the relative stability of the poly alpha-1,3-glucan or the poly alpha-1,3-glucan derivative to enzymatic hydrolysis. Having a resistance to hydrolysis is important for the use of these materials in applications wherein enzymes are present, such as in detergent, fabric care and/or laundry care applications. In some embodiments, the poly alpha-1,3-glucan or the poly alpha-1,3-glucan derivative are resistant to cellulases. In other embodiments, the poly alpha-1,3-glucan or the poly alpha-1,3-glucan derivative are resistant to proteases. In still further embodiments, the poly alpha-1,3-glucan or the poly alpha-1,3-glucan derivative are resistant to amylases. In other embodiments, the poly alpha-1,3-glucan or the poly alpha-1,3-glucan derivative are resistant to multiple classes of enzymes, for example, two or more cellulases, proteases, amylases or combinations thereof. Resistance to any particular enzyme will be defined as having at least 50, 60, 70, 80, 90, 95 or 100% of the materials remaining after treatment with the respective enzyme. The percentage remaining may be determined by measuring the supernatant after enzyme treatment using SEC-HPLC. The assay to measure enzyme resistance can be determined using the following procedure: A sample of the poly alpha-1,3-glucan or poly alpha-1,3-glucan derivative is added to water in a vial and mixed using a PTFE magnetic stir bar to create a 1 percent by weight aqueous solution. The aqueous mixture is produced at pH 7.0 and 20° C. After the poly alpha-1,3-glucan or derivative thereof has completely dissolved, 1.0 milliliter (mL) (1 percent by weight of the enzyme formulation) of cellulase (PURADEX® EGL), amylase (PURASTAR® ST L) or protease (SAVINASE® 16.0L) is added and mixed for 72 hours (hrs) at 20° C. After 72 hrs of stirring, the reaction mixture is heated to 70° C. for 10 minutes to inactivate the added enzyme, and the resulting mixture is cooled to room temperature and centrifuged to remove any precipitate. The supernatant is analyzed by SEC-HPLC for recovered poly alpha-1,3-glucan or poly alpha-1,3-glucan derivative and compared to a control where no enzyme was added to the reaction mixture. Percent changes in area counts for the respective poly alpha-1,3-glucan or derivative thereof may be used to test the relative resistance of the materials to the respective enzyme treatment. Percent changes in area versus the total will be used to assess the relative amount of materials remaining after treatment with a particular enzyme. Materials having a percent recovery of at least 50%, preferably at least 60, 70, 80, 90, 95 or 100% will be considered "resistant" to the respective enzyme treatment.

The poly alpha-1,3-glucan and the poly alpha-1,3-glucan derivatives are synthetic, man-made compounds. Likewise, compositions comprising the poly alpha-1,3-glucan derivatives are synthetic, man-made compounds.

The term "degree of substitution" (DoS) as used herein refers to the average number of hydroxyl groups substituted in each monomeric unit (glucose) of the poly alpha-1,3-glucan. Since there are at most three hydroxyl groups in a glucose monomeric unit in the poly alpha-1,3-glucan, the degree of substitution can be no higher than 3.

The term "molar substitution" (M.S.) as used herein refers to the moles of an organic group per monomeric unit of the poly alpha-1,3-glucan or the derivative thereof. It is noted that the molar substitution value for the poly alpha-1,3-glucan derivative may have a very high upper limit, for example in the hundreds or even thousands. For example, if the organic group is a hydroxyl-containing alkyl group, via the addition of ethylene oxide to one of the hydroxyl groups of the poly alpha-1,3-glucan, then the so-formed hydroxyl group from the ethylene oxide can then be further etherified to form a polyether.

The phrase "aqueous composition" herein refers to a solution or mixture in which the solvent is at least about 20% by weight of water and which comprises the poly alpha-1,3-glucan derivative. Examples of aqueous compositions herein are aqueous solutions and hydrocolloids.

The terms "hydrocolloid" and "hydrogel" are used interchangeably herein. A hydrocolloid refers to a colloid system in which water is the dispersion medium. A "colloid" herein refers to a substance that is microscopically dispersed throughout another substance. Therefore, a hydrocolloid herein can also refer to a dispersion, emulsion, mixture, or solution of the poly alpha-1,3-glucan derivative in water or aqueous solution.

The term "aqueous solution" herein refers to a solution in which the solvent is water. The poly alpha-1,3-glucan derivative can be dispersed, mixed, and/or dissolved in an aqueous solution. An aqueous solution can serve as the dispersion medium of a hydrocolloid herein.

The terms "dispersant" and "dispersion agent" are used interchangeably herein to refer to a material that promotes the formation and stabilization of a dispersion of one substance in another. A "dispersion" herein refers to an aqueous composition comprising one or more particles, for example, any ingredient of a personal care product, pharmaceutical product, food product, household product or industrial product that are scattered, or uniformly distributed, throughout the aqueous composition. It is believed that the poly alpha-1,3-glucan or the poly alpha-1,3-glucan derivative can act as dispersants in aqueous compositions disclosed herein.

The term "viscosity" as used herein refers to the measure of the extent to which a fluid or an aqueous composition such as a hydrocolloid resists a force tending to cause it to flow. Various units of viscosity that can be used herein include centipoise (cPs) and Pascal-second (Pa·s). A centipoise is one one-hundredth of a poise; one poise is equal to $0.100$ kg·m$^{-1}$·s$^{-1}$. Thus, the terms "viscosity modifier" and "viscosity-modifying agent" as used herein refer to anything that can alter/modify the viscosity of a fluid or aqueous composition.

The terms "fabric", "textile", and "cloth" are used interchangeably herein to refer to a woven or non-woven material having a network of natural and/or artificial fibers. Such fibers can be thread or yarn, for example.

A "fabric care composition" herein is any composition suitable for treating fabric in some manner. Suitable examples of such a composition include non-laundering fiber treatments (for desizing, scouring, mercerizing, bleaching, coloration, dying, printing, bio-polishing, antimicrobial treatments, anti-wrinkle treatments, stain resistance treatments, etc.), laundry care compositions (e.g., laundry care detergents), and fabric softeners.

The terms "detergent composition", "heavy duty detergent" and "all-purpose detergent" are used interchangeably herein to refer to a composition useful for regular washing of a substrate, for example, dishware, cutlery, vehicles, fabrics, carpets, apparel, white and colored textiles at any temperature.

The terms "cellulase" and "cellulase enzyme" are used interchangeably herein to refer to an enzyme that hydrolyzes β-1,4-D-glucosidic linkages in cellulose, thereby partially or completely degrading cellulose. Cellulase can alternatively be referred to as "β-1,4-glucanase", for example, and can have endocellulase activity (EC 3.2.1.4), exocellulase activity (EC 3.2.1.91), or cellobiase activity (EC 3.2.1.21). A cellulase in certain embodiments herein can also hydrolyze β-1,4-D-glucosidic linkages in cellulose ether derivatives such as carboxymethyl cellulose. "Cellulose" refers to an insoluble polysaccharide having a linear chain of β-1,4-linked D-glucose monomeric units.

As used herein, the term "fabric hand" or "handle" is meant people's tactile sensory response towards fabric which may be physical, physiological, psychological, social or any combination thereof. In some embodiments, the fabric hand may be measured using a PHABROMETER® System (available from Nu Cybertek, Inc. Davis, Calif.) for measuring the relative hand value as given by the American Association of Textile Chemists and Colorists (AATCC test method "202-2012, Relative Hand Value of Textiles: Instrumental Method").

The composition comprises a poly alpha-1,3-glucan derivative wherein the poly alpha-1,3-glucan derivative is a poly alpha-1,3-glucan substituted with:

a) one or more polyamine groups;
b) one or more polyether groups; or
c) a combination of a) and b).

In one embodiment, the poly alpha-1,3-glucan derivative comprises poly alpha-1,3-glucan substituted with a) one or more polyamine groups.

In another embodiment, the poly alpha-1,3-glucan derivative comprises poly alpha-1,3-glucan substituted with b) one or more polyether groups. In an additional embodiment, the poly alpha-1,3-glucan derivative comprises poly alpha-1,3-glucan substituted with c) a combination of a) and b), wherein the poly alpha-1,3-glucan is substituted with one or more polyamine groups and also substituted with one or more polyether groups. In yet another embodiment, the poly alpha-1,3-glucan derivative comprises poly alpha-1,3-glucan substituted with c) a combination of a) and b), wherein one or more substituents on the poly alpha-1,3-glucan contain both at least one polyamine group and also at least one polyether group. In a further embodiment, the poly alpha-1,3-glucan derivative comprises poly alpha-1,3-glucan substituted with c) a combination of a) and b), wherein at least one polyamine group is terminated with one or more polyether groups. In yet a further embodiment, the poly alpha-1,3-glucan derivative comprises poly alpha-1,3-glucan substituted with c) a combination of a) and b), wherein at least one polyether group is terminated with one or more polyamine groups.

The poly alpha-1,3-glucan derivatives disclosed herein comprise poly alpha-1,3-glucan which has polyether groups and/or polyamine groups randomly substituted along the glucan backbone, such that the glucan backbone comprises unsubstituted and substituted alpha-D-glucose rings in cases where the degree of substitution is less than 3, and fully substituted alpha-D-glucose rings in cases where the degree of substitution is 3. As used herein, the term "randomly substituted" means the substituents on the glucose rings in the randomly substituted poly alpha-1,3-glucan occur in a non-repeating or random fashion. That is, the substitution on a substituted glucose ring may be the same or different [i.e. the substituents (which may be the same or different) on different atoms in the glucose rings in the poly alpha-1,3-glucan] from the substitution on a second substituted glucose ring in the poly alpha-1,3-glucan, such that the overall substitution on the polymer has no pattern. Further, the substituted glucose rings occur randomly within the poly alpha-1,3-glucan (i.e., there is no pattern with the substituted and unsubstituted glucose rings within the poly alpha-1,3-glucan).

The composition can be in the form of a liquid, a gel, a powder, a hydrocolloid, an aqueous solution, a granule, a tablet, a capsule, a single compartment sachet or a multi-compartment sachet. In some embodiments, the composition is in the form of a liquid, a gel, a powder, a single compartment sachet or a multi-compartment sachet.

As was stated previously, the poly alpha-1,3-glucan can be prepared in a number of ways, including enzymatically from sucrose using one or more glucosyltransferase (gtf) enzymes (e.g., gtfJ), such as described in U.S. Pat. Nos. 7,000,000; 8,642,757; and 9,080,195 (the entirety of which are incorporated herein by reference), for example. Produced using the gtfJ enzyme, the poly alpha-1,3-glucan can have a number average degree of polymerization (DPn) in the range of 4 to 500. In other embodiments, the DPn can be in the range of from 30 to 500 or from 40 to 500 or from 50 to 450 or from 50 to 400.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3. In some embodiments, the poly alpha-1,3-glucan comprises greater than or equal to 93 to 97% alpha-1,3-glycosidic linkages and less than 3% alpha-1,6-glycosidic linkages. In other embodiments, the poly alpha-1,3-glucan comprises greater than or equal to 95% alpha-1,3-glycosidic linkages and about 1% alpha-1,6-glycosidic linkages. In a further embodiment, the poly alpha-1,3-glucan comprises less than or equal to 1 to 3% alpha-1,3,6-glycosidic linkages.

Poly Alpha-1,3-Glucan Derivative Formation

The poly alpha-1,3-glucan derivatives can be produced from poly alpha-1,3-glucan using known methods. For example, contact of the poly alpha-1,3-glucan with an epoxide, for example, ethylene oxide or propylene oxide in the presence of a base can produce a poly alpha-1,3-glucan ether wherein the ether group comprises a hydroxyl group. The hydroxyl group may undergo further reaction with an epoxide, producing a polyether having two or more ether repeat units. Depending on the molar amounts of the epoxide or poly alpha-1,3-glucan, one or more of the hydroxyl groups of the poly alpha-1,3-glucan can be monoalkoxylated or polyalkoxylated.

In other embodiments, contact of the poly alpha-1,3-glucan with epichlorohydrin in the presence of a base, followed by contact of at least a portion of the epoxide groups with an amine or polyamine can produce a poly alpha-1,3-glucan derivative having both amine and hydroxyl functional groups.

In other embodiments, contact of the poly alpha-1,3-glucan with an alkyl chloroacetate or an alkyl chloroformate, for example, methyl chloroacetate, ethyl chloroacetate, methyl chloroformate or ethyl chloroformate in the presence of a base can result in the formation of an ester functional poly alpha-1,3-glucan. Subsequent contact of at least a portion of the ester groups with an amine or a polyamine, can result in a poly alpha-1,3-glucan derivative comprising an amide functional group or a derivative comprising both amide and amine functional groups.

In other embodiments, contact of the poly alpha-1,3-glucan with acrylonitrile can result in a cyano-functional poly alpha-1,3-glucan derivative. At least a portion of the cyano groups can be reduced, using hydrogen and a catalyst or another reducing agent to produce an amine functional poly alpha-1,3-glucan. Alternatively, at least a portion of the cyano groups can be treated with hydroxyl amine to form an amidoxime group, that is a group having a formula of —C(=NOH)NR$^3$R$^4$. At least a portion of the amine group(s) can subsequently treated with an epoxide, for example, ethylene oxide or propylene oxide, to produce a poly alpha-1,3-glucan derivative substituted with an alkoxylated amine.

In other embodiments, at least a portion of the cyano groups can be treated with a base, to form a carboxylic acid functional poly alpha-1,3-glucan. If less than a stoichiometric amount of the cyano groups are treated to form the carboxylic acid group, at least a portion of the remaining cyano groups can be reduced as discussed above, or treated with hydroxyl amine to form an amidoxime. Poly alpha-1,3-glucan derivatives having both carboxylic acid functional groups and amine functional groups can be useful due to the formation of zwitterion.

In other embodiments, the poly alpha-1,3-glucan can be treated with a leaving group, for example, tosyl chloride, in the presence of a base. The product can then be treated with an amine or a polyamine.

In other embodiments, poly alpha-1,3-glucan having a hydroxyl group on the carbon atom at the 6-position can be oxidized to form a carboxylic acid or aldehyde functional poly alpha-1,3-glucan derivative. At least a portion of the aldehyde groups can be contacted with an amine or a polyamine to form an imine, which can then be reduced, for example, with sodium cyanoborohydride, to form an amine or polyamine functional poly alpha-1,3-glucan derivative. If desired, any of the carboxylic acid functional groups can be contacted with an amine or a polyamine, using known methods, to form an amide or an amine functional amide. In other embodiments, the carboxylic acid functional group can be contacted with an epoxide, to form a polyether.

In still further embodiments, any of the amines or polyamines discussed above can be subsequently contacted with one or more epoxy functional molecules, for example, ethylene oxide, propylene oxide and/or butylene oxide to form alkoxylated amines. Alternatively, prior to coupling the amine or polyamine with the poly alpha-1,3-glucan or the poly alpha-1,3-glucan derivative, the amine or the polyamine can first be contacted with an epoxy functional molecule, to form an alkoxylated amine. In further embodiments, one or more of the amines can be contacted with both ethylene oxide and propylene oxide, forming a polyether containing blocks of ethylene glycol and blocks of propylene glycol or a random polyether comprising both ethylene and propylene glycol repeat units.

In some embodiments, the degree of substitution for any one non-hydrogen R, R$^1$ or R$^2$ is in the range of from 0.1 to 3.0. In other embodiments, the degree of substitution can be in the range of from 0.1 to 2.5 or from 0.1 to 2.0 or from 0.2 to 2.0. The poly alpha-1,3-glucan derivative can have one or more repeat units according to the formula (—CH$_2$CH$_2$O—)$_{2-100}$, (—CH$_2$CH(CH$_3$)O—)$_{2-100}$, ((CH$_2$)$_{2-6}$NH)$_q$ or a combination thereof, wherein q is 0 to 12. In some embodiments, q is 1 to 12, or 1 to 10. The term ((CH$_2$)$_{2-6}$NH) can also be expressed as ((CH$_2$)$_y$NH) wherein y is from 2 to 6 inclusive. As used herein, the subscript designating a range of values will be used to designate the potential number of repeat units, for example, (CH$_2$CH$_2$O)$_{2-100}$ means a polyether group containing in the range of from 2 to 100 repeat units. In some embodiments, R$^2$ is —CH$_2$OCH$_2$CH$_2$C(O)NH(CH$_2$)$_2$NH$_2$, —CH$_2$OCH$_2$CH(OH)CH$_2$NH(CH$_2$)$_2$NH$_2$, —CH$_2$O(CH$_2$CH$_2$O)$_{2-100}$H, —CH$_2$O(CH$_2$CH(CH$_3$)O)$_{2-100}$H, —CH$_2$OCH$_2$CH(OH)CH$_2$NH—R$^7$—(N(R$^5$)R$^7$)$_{0-12}$NH$_2$, —CH$_2$NH(CH$_2$)$_{2-6}$NH$_2$, —C(O)NH(CH$_2$)$_{2-6}$NH$_2$, —CH$_2$OC(O)NH(CH$_2$)$_{2-6}$NH$_2$, —CH$_2$OCH$_2$CH$_2$C(O)NH(CH$_2$)$_{2-6}$NH(CH$_2$CH$_2$O)$_{2-100}$H, —CH$_2$OCH$_2$CH$_2$C(O)NH(CH$_2$)$_{2-6}$NH(CH$_2$CH(CH$_3$)O)$_{2-100}$H, —CH$_2$OCH$_2$CH(OH)CH$_2$NH(CH$_2$)$_{2-6}$NH(CH$_2$CH$_2$O)$_{2-100}$H, —CH$_2$OCH$_2$CH(OH)CH$_2$NH(CH$_2$)$_{2-6}$NH(CH$_2$CH(CH$_3$)O)$_{2-100}$H, —CH$_2$OCH$_2$CH(OH)CH$_2$NH—R$^7$—(N(R$^5$)R$^7$)$_{0-12}$—NH(CH$_2$CH$_2$O)$_{2-100}$H, —CH$_2$OCH$_2$CH(OH)CH$_2$NH—R$^7$—(N(R$^5$)R$^7$)$_{6-12}$—NH(CH$_2$CH(CH$_3$)O)$_{2-100}$H, —CH$_2$NH(CH$_2$CH$_2$O)$_{1-100}$CH$_2$CH$_2$NH$_2$, —CH$_2$NH(CH$_2$CH(CH$_3$)O)$_{1-100}$CH$_2$CH$_2$NH$_2$, —CH$_2$NH(CH$_2$CH$_2$O)$_{1-100}$CH$_2$CH$_2$NH(CH$_2$CH$_2$O)$_{1-100}$H, —CH$_2$NH(CH$_2$CH(CH$_3$)O)$_{1-100}$CH$_2$CH$_2$NH(CH$_2$CH(CH$_3$)O)$_{1-100}$H, —CH$_2$NH$_2$NHC(O)(CH$_2$CH$_2$O)$_{1-100}$C(O)NHNH$_2$, CH$_2$NH$_2$NHC(O)(CH$_2$CH(CH$_3$)O)$_{1-100}$C(O)NHNH$_2$, CH$_2$NH$_2$NHC(O)(CH$_2$O)$_{1-100}$C(O)NHNH(CH$_2$CH$_2$O)$_{1-100}$H, CH$_2$NH$_2$NHC(O)(CH$_2$CH(CH$_3$)O)$_{1-100}$C(O)

NHNH(CH$_2$CH(CH$_3$)O)$_{1-100}$H, —CH$_2$NH(CH$_2$)$_{2-6}$NH(CH$_2$CH$_2$O)$_{2-100}$H, —CH$_2$NH(CH$_2$)$_{2-6}$NH(CH$_2$CH(CH$_3$)O)$_{2-100}$H, —C(O)NH(CH$_2$)$_{2-6}$NH(CH$_2$CH$_2$O)$_{2-100}$H, —C(O)NH(CH$_2$)$_{2-6}$NH(CH$_2$CH(CH$_3$)O)$_{2-100}$H, —CH$_2$OC(O)NH(CH$_2$)$_{2-6}$NH(CH$_2$CH$_2$O)$_{2-100}$H, —CH$_2$OC(O)NH(CH$_2$)$_{2-6}$NH(CH$_2$CH(CH$_3$)O)$_{2-100}$H or a combination thereof. In some embodiments, R and R$^1$ are independently —(CH$_2$CH$_2$O)$_{2-100}$H, —(CH$_2$CH(CH$_3$)O)$_{2-100}$H, —CH$_2$CH$_2$C(O)NH(CH$_2$)$_{2-6}$NH$_2$, —CH$_2$CH(OH)CH$_2$NH(CH$_2$)$_{2-6}$NH$_2$, —CH$_2$CH(OH)CH$_2$NH—R$^7$—(N(R$^5$)R$^7$)$_{0-12}$—NH$_2$, —CH$_2$CH$_2$C(O)NH(CH$_2$)$_{2-6}$NH(CH$_2$CH$_2$O)$_{2-100}$H, —CH$_2$CH$_2$C(O)NH(CH$_2$)$_{2-6}$NH(CH$_2$CH(CH$_3$)O)$_{2-100}$H, —CH$_2$CH(OH)CH$_2$NH(CH$_2$)$_{2-6}$NH(CH$_2$CH$_2$O)$_{2-100}$H, —CH$_2$CH(OH)CH$_2$NH(CH$_2$)$_{2-6}$NH(CH$_2$CH(CH$_3$)O)$_{2-100}$H, —CH$_2$CH(OH)CH$_2$NH—R$^7$—(N(R$^5$)R$^7$)$_{6-12}$—NH(CH$_2$CH$_2$O)$_{2-100}$H, —CH$_2$CH(OH)CH$_2$NH—R$^7$—(N(R$^5$)R$^7$)$_{0-12}$—NH(CH$_2$CH(CH$_3$)O)$_{2-100}$H, —C(O)NH(CH$_2$)$_{2-6}$NH(CH$_2$CH$_2$O)$_{2-100}$H, —C(O)NH(CH$_2$)$_{2-6}$NH(CH$_2$CH(CH$_3$)O)$_{2-100}$H, —CH$_2$OC(O)NH(CH$_2$)$_{2-6}$NH(CH$_2$CH$_2$O)$_{2-100}$H, —CH$_2$OC(O)NH(CH$_2$)$_{2-6}$NH(CH$_2$CH(CH$_3$)O)$_{2-100}$H or a combination thereof. In some embodiments, the poly alpha-1,3-glucan derivative comprises poly alpha-1,3-glucan substituted with —CH$_2$OCH$_2$CH(OH)CH$_2$NH(CH$_2$)$_{2-6}$NH(CH$_2$CH(CH$_3$)O)$_{2-100}$H, and/or —CH$_2$OCH$_2$CH(OH)CH$_2$NH—R$^7$—(N(R$^5$)—R$^7$)$_{0-12}$—NH(CH$_2$CH$_2$O)$_{2-100}$H.

Detergent Composition

Depending upon the desired application, the poly alpha-1,3-glucan derivative can be formulated, for example, blended, mixed, incorporated into, with one or more other materials and/or active ingredients suitable for use in laundry care, textile/fabric care, and/or personal care products. The term "composition comprising the poly alpha-1,3-glucan derivative" in this context may include, for example, aqueous formulations comprising the poly alpha-1,3-glucan derivative, rheology modifying compositions, fabric treatment/care compositions, laundry care formulations/compositions, fabric softeners or personal care compositions (hair, skin and oral care).

In some embodiments, compositions comprising the poly alpha-1,3-glucan derivative can be in the form of a fabric care composition. A fabric care composition can be used for hand wash, machine wash and/or other purposes such as soaking and/or pretreatment of fabrics, for example. A fabric care composition may take the form of, for example, a laundry detergent; fabric conditioner; any wash-, rinse-, or dryer-added product; unit dose or spray. Fabric care compositions in a liquid form may be in the form of an aqueous composition. In other embodiments, a fabric care composition can be in a dry form such as a granular detergent or dryer-added fabric softener sheet. Other non-limiting examples of fabric care compositions can include: granular or powder-form all-purpose or heavy-duty washing agents; liquid, gel or paste-form all-purpose or heavy-duty washing agents; liquid or dry fine-fabric (e.g. delicates) detergents; cleaning auxiliaries such as bleach additives, "stain-stick", or pre-treatments; substrate-laden products such as dry and wetted wipes, pads, or sponges; sprays and mists.

The composition can be in any useful form, for example, as powders, granules, pastes, bars, unit dose, or liquid. A liquid detergent composition may be aqueous, typically containing up to about 70% by weight of water and 0% to about 30% by weight of organic solvent. It may also be in the form of a compact gel type containing less than or equal to 30% by weight water.

The poly alpha-1,3-glucan derivative comprising one or more poly ether groups, one or more polyamine groups, or a combination thereof can be used as an ingredient in the desired product or may be blended with one or more additional suitable ingredients and used as, for example, fabric care applications, laundry care applications, and/or personal care applications. Any of the disclosed compositions, for example, a fabric care, a laundry care or a personal care composition can comprise in the range of 0.01 to 99 percent by weight of the poly alpha-1,3-glucan derivative, based on the total dry weight of the composition (dry solids basis). The term "total dry weight" means the weight of the composition excluding any solvent, for example, any water that might be present. In other embodiments, the composition comprises 0.1 to 10% or 0.1 to 9% or 0.5 to 8% or 1 to 7% or 1 to 6% or 1 to 5% or 1 to 4% or 1 to 3% or 5 to 10% or 10 to 15% or 15 to 20% or 20 to 25% or 25 to 30% or 30 to 35% or 35 to 40% or 40 to 45% or 45 to 50% or 50 to 55% or 55 to 60% or 60 to 65% or 65 to 70% or 70 to 75% or 75 to 80% or 80 to 85% or 85 to 90% or 90 to 95% or 95 to 99% by weight of the poly alpha-1,3-glucan derivative, wherein the percentages by weight are based on the total dry weight of the composition.

The composition can further comprise at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof. In some embodiments, the composition can further comprise at least one of a colorant, a fluorescer, a fabric conditioner, a hydrolysable surfactant, a preservative, an anti-shrinkage agent, an anti-wrinkle agent, a germicide, a fungicide, a processing aid, a pH control agent, a fabric softener, a solubilizing agent, an enzyme stabilizer, a hydrotope, a carrier, a filler, or a combination thereof.

The composition can be a detergent composition useful for, for example, fabric care, laundry care and/or personal care and may further contain one or more active enzymes. Non-limiting examples of suitable enzymes include proteases, cellulases, hemicellulases, peroxidases, lipolytic enzymes (e.g., metallolipolytic enzymes), xylanases, lipases, phospholipases, esterases (e.g., arylesterase, polyesterase), perhydrolases, cutinases, pectinases, pectate lyases, mannanases, keratinases, reductases, oxidases (e.g., choline oxidase), phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases, metalloproteases, phosphatases, lactases, cellobiohydrolases, alpha-galactosidases, beta-galactosidases, galactanases, lysozymes, or a combination thereof. If an enzyme(s) is included, it may be present in the composition at about 0.0001 to 0.1% by weight of the active enzyme, based on the total weight of the composition. In other embodiments, the enzyme can be present at about 0.01 to 0.03% by weight of the active enzyme (e.g., calculated as pure enzyme protein) based on the total weight of the composition. In some embodiments, a combination of two or more enzymes can be used in the composition. In some embodiments, the two or more enzymes are cellulase and one or more of proteases, hemicellulases, peroxidases, lipolytic enzymes, xylanases, lipases, phospholipases, esterases, perhydrolases, cutinases, pectinases, pectate lyases, mannanases, keratinases, reductases, oxidases, phenoloxidases, lipoxygenases, ligninases, pullulanases, tannases, pentosanases, malanases, beta-glucanases, arabinosidases, hyaluronidases, chondroitinases, laccases, metalloproteinases, amadoriases, glucoamylases, arabinofuranosidases, phytases, isomerases, transferases, amylases, or a combination thereof.

In some embodiments, the composition can comprise one or more enzymes, each enzyme present from about 0.00001% to about 10% by weight, based on the total weight of the composition. In some embodiments, the composition can also comprise each enzyme at a level of about 0.0001% to about 10%, about 0.001% to about 5%, about 0.001% to about 2% or about 0.005% to about 0.5% by weight, based on the total weight of the composition.

In one embodiment, the enzyme can comprise at least one protease. In one embodiment, the composition can comprise one or more proteases. In one embodiment, the protease is a serine protease. In another embodiment, the protease is an alkaline microbial protease or a trypsin-like protease. Suitable proteases include those of animal, vegetable, or microbial origin. In some embodiments, the protease is a microbial protease. In other embodiments, the protease is a chemically or genetically modified mutant.

A cellulase can have endocellulase activity (EC 3.2.1.4), exocellulase activity (EC 3.2.1.91), or cellobiase activity (EC 3.2.1.21). A cellulase is an "active cellulase" having activity under suitable conditions for maintaining cellulase activity; it is within the skill of the art to determine such suitable conditions. Besides being able to degrade cellulose, a cellulase in certain embodiments can also degrade cellulose ether derivatives such as carboxymethyl cellulose.

The cellulase may be derived from any microbial source, such as a bacteria or fungus. Chemically-modified cellulases or protein-engineered mutant cellulases are included. Suitable cellulases include, for example, cellulases from the genera *Bacillus, Pseudomonas, Streptomyces, Trichoderma, Humicola, Fusarium, Thielavia* and *Acremonium*. As other examples, the cellulase may be derived from *Humicola insolens, Myceliophthora thermophile, Fusarium oxysporum, Trichoderma reesei* or a combination thereof. The cellulase, such as any of the foregoing, can be in a mature form lacking an N-terminal signal peptide. Commercially available cellulases useful herein include CELLUSOFT®, CELLUCLEAN®, CELLUZYME® and CAREZYME® (Novozymes A/S); CLAZINASE® and PURADAX® HA and REVITALENZ™ (DuPont Industrial Biosciences), BIOTOUCH® (AB Enzymes); and KAC-500(B)® (Kao Corporation).

Alternatively, a cellulase herein may be produced by any means known in the art, for example, a cellulase may be produced recombinantly in a heterologous expression system, such as a microbial or fungal heterologous expression system. Examples of heterologous expression systems include bacterial (e.g., *E. coli, Bacillus* sp.) and eukaryotic systems. Eukaryotic systems can employ yeast (e.g., *Pichia* sp., *Saccharomyces* sp.) or fungal (e.g., *Trichoderma* sp. such as *T. reesei, Aspergillus* species such as *A. niger*) expression systems, for example.

The cellulase in certain embodiments can be thermostable. Cellulase thermostability refers to the ability of the enzyme to retain activity after exposure to an elevated temperature (e.g. about 60-70° C.) for a period of time (e.g., about 30-60 minutes). The thermostability of a cellulase can be measured by its half-life (t½) given in minutes, hours, or days, during which time period half the cellulase activity is lost under defined conditions.

The cellulase in certain embodiments can be stable to a wide range of pH values (e.g. neutral or alkaline pH such as pH of ~7.0 to ~11.0). Such enzymes can remain stable for a predetermined period of time (e.g., at least about 15 min., 30 min., or 1 hour) under such pH conditions.

At least one, two, or more cellulases may be included in the composition. The total amount of cellulase in a composition herein typically is an amount that is suitable for the purpose of using cellulase in the composition (an "effective amount"). For example, an effective amount of cellulase in a composition intended for improving the feel and/or appearance of a cellulose-containing fabric is an amount that produces measurable improvements in the feel of the fabric (e.g., improving fabric smoothness and/or appearance, removing pills and fibrils which tend to reduce fabric appearance sharpness). As another example, an effective amount of cellulase in a fabric stonewashing composition herein is that amount which will provide the desired effect (e.g., to produce a worn and faded look in seams and on fabric panels). The amount of cellulase in a composition herein can also depend on the process parameters in which the composition is employed (e.g., equipment, temperature, time, and the like) and cellulase activity, for example. The effective concentration of cellulase in an aqueous composition in which a fabric is treated can be readily determined by a skilled artisan. In fabric care processes, cellulase can be present in an aqueous composition (e.g., wash liquor) in which a fabric is treated in a concentration that is minimally about 0.01-0.1 ppm total cellulase protein, or about 0.1-10 ppb total cellulase protein (e.g., less than 1 ppm), to maximally about 100, 200, 500, 1000, 2000, 3000, 4000, or 5000 ppm total cellulase protein, for example.

Suitable enzymes are known in the art and can include, for example, MAXATASE®, MAXACAL™, MAXAPEM™, OPTICLEAN®, OPTIMASE®, PROPERASE®, PURAFECT®, PURAFECT® OXP, PURAMAX™, EXCELLASE™, PREFERENZ™ proteases (e.g. P100, P110, P280), EFFECTENZ™ proteases (e.g. P1000, P1050, P2000), EXCELLENZ™ proteases (e.g. P1000), ULTIMASE®, and PURAFAST™ (Genencor); ALCALASE®, ALCALASE® ULTRA, BLAZE®, BLAZE® EVITY®, BLAZE EVITY® 16L, CORONASE®, SAVINASE®, SAVINASE® ULTRA, SAVINASE® EVITY®, SAVINASE® EVERIS®, PRIMASE®, DURAZYM™, POLARZYME®, OVOZYME®, KANNASE®, LIQUANASE®, EVERIS®, NEUTRASE®, RELASE® and ESPERASE® (Novozymes); BLAP™ and BLAP™ variants (Henkel Kommanditgesellschaft auf Aktien, Duesseldorf, Germany), and KAP (*B. alkalophilus* subtilisin; Kao Corp., Tokyo, Japan) proteases; MANNASTAR®, PURABRITE™, and MANNAWAY® mannanases; M1 LIPASE™, LUMA FAST™, and LIPOMAX™ (Genencor); LIPEX®, LIPOLASE® and LIPOLASE® ULTRA (Novozymes); and LIPASE P™ "Amano" (Amano Pharmaceutical Co. Ltd., Japan) lipases; STAINZYME®, STAINZYME PLUS®, NATALASE®, DURAMYL®, TERMAMYL®, TERMAMYL ULTRA®, FUNGAMYL® and BAN™ (Novo Nordisk A/S and Novozymes A/S); RAPIDASE®, POWERASE®, PURASTAR® and PREFERENZ™ (DuPont Industrial Biosciences) amylases; GUARDZYME™ (Novo Nordisk A/S and Novozymes A/S) peroxidases or a combination thereof.

In some embodiments, the enzymes in the composition can be stabilized using conventional stabilizing agents, e.g., a polyol such as propylene glycol or glycerol; a sugar or sugar alcohol; lactic acid; boric acid or a boric acid derivative (e.g., an aromatic borate ester).

A detergent composition herein typically comprises one or more surfactants, wherein the surfactant is selected from nonionic surfactants, anionic surfactants, cationic surfactants, ampholytic surfactants, zwitterionic surfactants, semipolar nonionic surfactants and mixtures thereof. In some embodiments, the surfactant is present at a level of from about 0.1% to about 60%, while in alternative embodiments the level is from about 1% to about 50%, while in still further embodiments the level is from about 5% to about 40%, by weight of the cleaning composition. A detergent will usually contain 0% to about 50% by weight of an anionic surfactant such as linear alkylbenzenesulfonate (LAS), alpha-olefinsulfonate (AOS), alkyl sulfate (fatty alcohol sulfate) (AS), alcohol ethoxysulfate (AEOS or AES), secondary alkanesulfonates (SAS), alpha-sulfo fatty acid methyl esters, alkyl- or alkenylsuccinic acid, or soap. In addition, a detergent composition may optionally contain 0 wt % to about 40 wt % of a nonionic surfactant such as alcohol ethoxylate (AEO or AE), carboxylated alcohol ethoxylates, nonylphenol ethoxylate, alkylpolyglycoside, alkyldimethylamineoxide, ethoxylated fatty acid monoethanolamide, fatty acid monoethanolamide, or polyhydroxy alkyl fatty acid amide.

The composition can further comprise one or more detergent builders or builder systems. In some embodiments incorporating at least one builder, the compositions comprise at least about 1%, from about 3% to about 60% or from about 5% to about 40% by weight of the builder, based on the total weight of the composition. Builders include, for example, the alkali metal, ammonium and/or alkanolammonium salts of polyphosphates, alkali metal silicates, alkaline earth and alkali metal carbonates, aluminosilicates, polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof. Examples of a detergent builder or complexing agent include zeolite, diphosphate, triphosphate, phosphonate, citrate, nitrilotriacetic acid (NTA), ethylenediaminetetraacetic acid (EDTA), diethylenetriaminepentaacetic acid (DTMPA), alkyl- or alkenylsuccinic acid, soluble silicates or layered silicates (e.g., SKS-6 from Hoechst). A detergent may also be unbuilt, i.e., essentially free of detergent builder.

The composition can further comprise at least one chelating agent. Suitable chelating agents include, for example, copper, iron and/or manganese chelating agents and mixtures thereof. In some embodiments in which at least one chelating agent is used, the compositions of the present invention comprise from about 0.1% to about 15% or even from about 3.0% to about 10% by weight of the chelating agent, based on the total weight of the composition.

The composition can further comprise at least one deposition aid. Suitable deposition aids include, for example, polyethylene glycol, polypropylene glycol, polycarboxylate, soil release polymers such as polytelephthalic acid, clays such as kaolinite, montmorillonite, atapulgite, illite, bentonite, halloysite, or a combination thereof.

The composition can further comprise one or more dye transfer inhibiting agents. Suitable dye transfer inhibiting agents include, for example, polyvinylpyrrolidone polymers, polyamine N-oxide polymers, copolymers of N-vinylpyrrolidone and N-vinylimidazole, polyvinyloxazolidones, polyvinylimidazoles, manganese phthalocyanine, peroxidases, polyvinylpyrrolidone polymers, ethylene-diamine-tetraacetic acid (EDTA); diethylene triamine penta methylene phosphonic acid (DTPMP); hydroxy-ethane diphosphonic acid (HEDP); ethylenediamine N,N'-disuccinic acid (EDDS); methyl glycine diacetic acid (MGDA); diethylene triamine penta acetic acid (DTPA); propylene diamine tetracetic acid (PDT A); 2-hydroxypyridine-N-oxide (HPNO); or methyl glycine diacetic acid (MGDA); glutamic acid N,N-diacetic acid (N,N-dicarboxymethyl glutamic acid tetrasodium salt (GLDA); nitrilotriacetic acid (NTA); 4,5-dihydroxy-m-benzenedisulfonic acid; citric acid and any salts thereof; N-hydroxyethylethylenediaminetriacetic acid (HEDTA), triethylenetetraaminehexaacetic acid (TTNA), N-hydroxyethyliminodiacetic acid (HEIDA), dihydroxyethylglycine (DHEG), ethylenediaminetetrapropionic acid (EDTP) and derivatives thereof or a combination thereof. In embodiments in which at least one dye transfer inhibiting agent is used, the compositions can comprise from about 0.0001% to about 10%, from about 0.01% to about 5%, or even from about 0.1% to about 3% by weight of the dye transfer inhibiting agent, based on the total weight of the composition.

The composition can further comprise silicates. Suitable silicates can include, for example, sodium silicates, sodium disilicate, sodium metasilicate, crystalline phyllosilicates or a combination thereof. In some embodiments, silicates can be present at a level of from about 1% to about 20% by weight, based on the total weight of the composition. In other embodiments, silicates can be present at a level of from about 5% to about 15% by weight, based on the total weight of the composition.

The composition can further comprise dispersants. Suitable water-soluble organic materials can include, for example, homo- or co-polymeric acids or their salts, in which the polycarboxylic acid comprises at least two carboxyl radicals separated from each other by not more than two carbon atoms.

The composition can further comprise one or more other types of polymers in addition to the present poly alpha-1, 3-glucan derivatives. Examples of other types of polymers useful herein include carboxymethyl cellulose (CMC), poly (vinylpyrrolidone) (PVP), polyethylene glycol (PEG), poly (vinyl alcohol) (PVA), polycarboxylates such as polyacrylates, maleic/acrylic acid copolymers and lauryl methacrylate/acrylic acid copolymers.

The composition can further comprise a bleaching system. For example, the bleaching system can comprise an $H_2O_2$ source such as perborate, percarbonate, perhydrate salts, mono or tetra hydrate sodium salt of perborate, persulfate, perphosphate, persilicate, percarboxylic acids and salts, percarbonic acids and salts, perimidic acids and salts, peroxymonosulfuric acids and salts, sulfonated zinc phthalocyanines, sulfonated aluminum phthalocyanines, xanthenes dyes which may be combined with a peracid-forming bleach activator such as, for example, dodecanoyl oxybenzene sulfonate, decanoyl oxybenzene sulfonate, decanoyl oxybenzoic acid or salts thereof, tetraacetylethylenediamine (TAED) or nonanoyloxybenzenesulfonate (NOBS). Alternatively, a bleaching system may comprise peroxyacids (e.g., amide, imide, or sulfone type peroxyacids). In other embodiments, the bleaching system can be an enzymatic bleaching system comprising perhydrolase. Combinations of any of the above may also be used.

The composition can further comprise conventional detergent ingredients such as fabric conditioners, clays, foam boosters, suds suppressors, anti-corrosion agents, soil-suspending agents, anti-soil redeposition agents, dyes, bactericides, tarnish inhibiters, optical brighteners, or perfumes. The pH of a detergent composition herein (measured in aqueous solution at use concentration) can be neutral or alkaline (e.g., pH of about 7.0 to about 11.0).

The composition can be a detergent composition and optionally, a heavy duty (all purpose) laundry detergent composition. In some embodiments, the detergent composition can comprise a detersive surfactant (10%-40% wt/wt), including an anionic detersive surfactant (selected from a group of linear or branched or random chain, substituted or unsubstituted alkyl sulphates, alkyl sulphonates, alkyl alkoxylated sulphate, alkyl phosphates, alkyl phosphonates, alkyl carboxylates, and/or mixtures thereof), and optionally non-ionic surfactant (selected from a group of linear or branched or random chain, substituted or unsubstituted alkyl alkoxylated alcohol, e.g., $C_8$-$C_{18}$ alkyl ethoxylated alcohols and/or $C_6$-$C_{12}$ alkyl phenol alkoxylates), where the weight ratio of anionic detersive surfactant (with a hydrophilic index (HIc) of from 6.0 to 9) to non-ionic detersive surfactant is greater than 1:1. Suitable detersive surfactants also include cationic detersive surfactants (selected from a group of alkyl pyridinium compounds, alkyl quaternary ammonium compounds, alkyl quaternary phosphonium compounds, alkyl ternary sulphonium compounds, and/or mixtures thereof); zwitterionic and/or amphoteric detersive surfactants (selected from a group of alkanolamine sulphobetaines); ampholytic surfactants; semi-polar non-ionic surfactants and mixtures thereof.

The composition can be a detergent composition, optionally including, for example, a surfactancy boosting polymer consisting of amphiphilic alkoxylated grease cleaning polymers. Suitable amphiphilic alkoxylated grease cleaning polymers can include, for example, alkoxylated polymers having branched hydrophilic and hydrophobic properties, such as alkoxylated polyalkylenimines, random graft polymers comprising a hydrophilic backbone comprising monomers, for example, unsaturated $C_1$-$C_6$ carboxylic acids, ethers, alcohols, aldehydes, ketones, esters, sugar units, alkoxy units, maleic anhydride, saturated polyalcohols such as glycerol, and mixtures thereof; and hydrophobic side chain(s), for example, one or more $C_4$-$C_{25}$ alkyl groups, polypropylene, polybutylene, vinyl esters of saturated $C_1$-$C_6$ mono-carboxylic acids, $C_1$-$C_6$ alkyl esters of acrylic or methacrylic acid, and mixtures thereof.

Suitable heavy duty laundry detergent compositions can optionally include additional polymers such as soil release polymers (include anionically end-capped polyesters, for example SRP1, polymers comprising at least one monomer unit selected from saccharide, dicarboxylic acid, polyol and combinations thereof, in random or block configuration, ethylene terephthalate-based polymers and co-polymers thereof in random or block configuration, for example REPEL-O-TEX SF, SF-2 AND SRP6, TEXCARE SRA100, SRA300, SRN100, SRN170, SRN240, SRN300 AND SRN325, MARLOQUEST SL), anti-redeposition polymers, include carboxylate polymers, such as polymers comprising at least one monomer selected from acrylic acid, maleic acid (or maleic anhydride), fumaric acid, itaconic acid, aconitic acid, mesaconic acid, citraconic acid, methylenemalonic acid, and any mixture thereof, vinylpyrrolidone homopolymer, and/or polyethylene glycol, molecular weight in the range of from 500 to 100,000 Daltons (Da); and polymeric carboxylate (such as maleate/acrylate random copolymer or polyacrylate homopolymer). If present, soil release polymers can be included at 0.1 to 10% by weight, based on the total weight of the composition.

The heavy duty laundry detergent composition can optionally further include saturated or unsaturated fatty acids, preferably saturated or unsaturated $C_{12}$-$C_{24}$ fatty acids; deposition aids, for example, polysaccharides, cellulosic polymers, poly diallyl dimethyl ammonium halides (DADMAC), and co-polymers of DADMAC with vinyl pyrrolidone, acrylamides, imidazoles, imidazolinium halides, and mixtures thereof, in random or block configuration, cationic guar gum, cationic starch, cationic polyacylamides or a combination thereof. If present, the fatty acids and/or the deposition aids can each be present at 0.1% to 10% by weight, based on the total weight of the composition.

The detergent composition may optionally include silicone or fatty-acid based suds suppressors; hueing dyes, calcium and magnesium cations, visual signaling ingredients, anti-foam (0.001% to about 4.0% by weight, based on the total weight of the composition), and/or a structurant/thickener (0.01% to 5% by weight, based on the total weight of the composition) selected from the group consisting of diglycerides and triglycerides, ethylene glycol distearate, microcrystalline cellulose, microfiber cellulose, biopolymers, xanthan gum, gellan gum, and mixtures thereof).

The compositions disclosed herein can be in the form of a dishwashing detergent composition. Examples of dishwashing detergents include automatic dishwashing detergents (typically used in dishwasher machines) and handwashing dish detergents. A dishwashing detergent composition can be in any dry or liquid/aqueous form as disclosed herein, for example. Components that may be included in certain embodiments of a dishwashing detergent composition include, for example, one or more of a phosphate; oxygen- or chlorine-based bleaching agent; non-ionic surfactant; alkaline salt (e.g., metasilicates, alkali metal hydroxides, sodium carbonate); any active enzyme disclosed herein; anti-corrosion agent (e.g., sodium silicate); anti-foaming agent; additives to slow down the removal of glaze and patterns from ceramics; perfume; anti-caking agent (in granular detergent); starch (in tablet-based detergents); gelling agent (in liquid/gel based detergents); and/or sand (powdered detergents).

In addition to the poly alpha-1,3-glucan derivative, dishwashing detergent compositions can comprise (i) a non-ionic surfactant, including any ethoxylated non-ionic surfactant, alcohol alkoxylated surfactant, epoxy-capped poly (oxyalkylated) alcohol, or amine oxide surfactant present in an amount from 0 to 10% by weight; (ii) a builder, in the range of about 5 to 60% by weight, including any phosphate builder (e.g., mono-phosphates, di-phosphates, tri-polyphosphates, other oligomeric-polyphosphates, sodium tripolyphosphate-STPP), any phosphate-free builder (e.g., amino acid-based compounds including methyl-glycine-diacetic acid [MGDA] and salts or derivatives thereof, glutamic-N, N-diacetic acid [GLDA] and salts or derivatives thereof, iminodisuccinic acid (IDS) and salts or derivatives thereof, carboxy methyl inulin and salts or derivatives thereof, nitrilotriacetic acid [NTA], diethylene triamine penta acetic acid [DTPA], B-alaninediacetic acid [B-ADA] and salts thereof), homopolymers and copolymers of poly-carboxylic acids and partially or completely neutralized salts thereof, monomeric polycarboxylic acids and hydroxycarboxylic acids and salts thereof in the range of 0.5 to 50% by weight, or sulfonated/carboxylated polymers in the range of about 0.1% to about 50% by weight; (iii) a drying aid in the range of about 0.1% to about 10% by weight (e.g., polyesters, especially anionic polyesters, optionally together with further monomers with 3 to 6 functionalities, for example, acid, alcohol or ester functionalities which are conducive to polycondensation, polycarbonate-, polyurethane- and/or polyurea-polyorganosiloxane compounds or precursor compounds thereof, particularly of the reactive cyclic carbonate and urea type); (iv) a silicate in the range from about 1% to about 20% by weight (e.g., sodium or potassium silicates such as sodium disilicate, sodium meta-silicate and crystalline phyllosilicates); (v) an inorganic bleach (e.g., perhydrate salts such as perborate, percarbonate, perphosphate, persulfate and persilicate salts) and/or an organic bleach, for example, organic peroxyacids such as diacyl- and tetraacylperoxides, especially diperoxydodecanedioic acid, diperoxytetradecanedioic acid, and diperoxyhexadecanedioic acid; (vi) a bleach activator, for example, organic peracid precursors in the range from about 0.1% to about 10% by weight and/or bleach catalyst (e.g., manganese triazacyclononane and related complexes; Co, Cu, Mn, and Fe bispyridylamine and related complexes; and pentamine acetate cobalt(III) and related complexes); (vii) a metal care agent in the range from about 0.1% to 5% by weight, for example, benzatriazoles, metal salts and complexes, and/or silicates; and/or (viii) any active enzyme disclosed herein in the range from about 0.01 to 5.0 mg of active enzyme per gram of automatic dishwashing detergent composition, and an enzyme stabilizer component. The percentages by weight are based on the total weight of the composition.

Various examples of detergent formulations comprising at least one poly alpha-1,3-glucan derivative are disclosed below (1-19):

1) A detergent composition formulated as a granulate having a bulk density of at least 600 g/L comprising: linear alkylbenzenesulfonate (calculated as acid) at about 7 to 12% by weight; alcohol ethoxysulfate (e.g., $C_{12}$-$C_{18}$ alcohol, 1-2 ethylene oxide [EO]) or alkyl sulfate (e.g., $C_{16}$-$C_{18}$) at about 1 to 4% by weight; alcohol ethoxylate (e.g., $C_{14}$-$C_{15}$ alcohol) at about 5 to 9% by weight; sodium carbonate at about 14 to 20% by weight; soluble silicate (e.g., $Na_2O$ $2SiO_2$) at about 2 to 6% by weight; zeolite (e.g., $NaAlSiO_4$) at about 15 to 22% by weight; sodium sulfate at about 0 to 6% by weight; sodium citrate/citric acid at about 0 to 15% by weight; sodium perborate at about 11 to 18% by weight; TAED at about 2 to 6% by weight; poly alpha-1,3-glucan derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

2) A detergent composition formulated as a granulate having a bulk density of at least 600 g/L comprising: linear alkylbenzenesulfonate (calculated as acid) at about 6 to 11% by weight; alcohol ethoxysulfate (e.g., $C_{12}$-$C_{18}$ alcohol, 1-2 EO) or alkyl sulfate (e.g., $C_{16}$-$C_{18}$) at about 1 to 3% by weight; alcohol ethoxylate (e.g., $C_{14}$-$C_{15}$ alcohol) at about 5 to 9% by weight; sodium carbonate at about 15 to 21% by weight; soluble silicate (e.g., $Na_2O$ $2SiO_2$) at about 1 to 4% by weight; zeolite (e.g., $NaAlSiO_4$) at about 24 to 34% by weight; sodium sulfate at about 4 to 10% by weight; sodium citrate/citric acid at about 0 to 15% by weight; sodium perborate at about 11 to 18% by weight; TAED at about 2 to 6% by weight; poly alpha-1,3-glucan derivative up to about 2% by weight; other polymers (e.g., maleic/acrylic acid copolymer, PVP, PEG) at about 1 to 6% by weight; optionally an enzyme(s) (calculated as pure enzyme protein) at about 0.0001 to 0.1% by weight; and minor ingredients (e.g., suds suppressors, perfumes, optical brightener, photobleach) at about 0 to 5% by weight.

3) A detergent composition formulated as a granulate having a bulk density of at least 600 g/L comprising: linear alkylbenzenesulfonate (calculated as acid) at about 5 to 9% by weight; alcohol ethoxysulfate (e.g., $C_{12}$-$C_{18}$ alcohol, 7 EO) at about 7 to 14% by weight; soap as fatty acid (e.g., $C_{16}$-$C_{22}$ fatty acid) at about 1 to 3% by weight; sodium carbonate at about 10 to 17% by weight; soluble silicate (e.g., $Na_2O$ $2SiO_2$) at about 3 to 9% by weight; zeolite (e.g., $NaAlSiO_4$) at about 23 to 33% by weight; sodium sulfate at about 0 to 4% by weight; sodium perborate at about 8 to 16% by weight; TAED at about 2 to 8% by weight; phosphonate (e.g., EDTMPA) at about 0 to 1% by weight; poly alpha-1,3-glucan derivative up to about 2% by weight; other polymers (e.g., maleic/acrylic acid copolymer, PVP, PEG) at about 0 to 3% by weight; optionally an enzyme(s) (calculated as pure enzyme protein) at about 0.0001 to 0.1% by weight; and minor ingredients (e.g., suds suppressors, perfumes, optical brightener) at about 0 to 5% by weight.

4) A detergent composition formulated as a granulate having a bulk density of at least 600 g/L comprising: linear alkylbenzene sulfonate (calculated as acid) at about 8 to 12% by weight; alcohol ethoxylate (e.g., $C_{12}$-$C_{18}$ alcohol, 7 EO) at about 10 to 25% by weight; sodium carbonate at about 14 to 22% by weight; soluble silicate (e.g., $Na_2O$ $2SiO_2$) at about 1 to 5% by weight; zeolite (e.g., $NaAlSiO_4$) at about 25 to 35% by weight; sodium sulfate at about 0 to 10% by weight; sodium perborate at about 8 to 16% by weight; TAED at about 2 to 8% by weight; phosphonate (e.g., EDTMPA) at about 0 to 1% by weight; poly alpha-1,3-glucan derivative up to about 2% by weight; other polymers (e.g., maleic/acrylic acid copolymer, PVP, PEG) at about 1 to 3% by weight; optionally an enzyme(s) (calculated as pure enzyme protein) at about 0.0001 to 0.1% by weight; and minor ingredients (e.g., suds suppressors, perfumes) at about 0 to 5% by weight.

5) An aqueous liquid detergent composition comprising: linear alkylbenzenesulfonate (calculated as acid) at about 15 to 21% by weight; alcohol ethoxylate (e.g., $C_{12}$-$C_{18}$ alcohol, 7 EO; or $C_{12}$-$C_{15}$ alcohol, 5 EO) at about 12 to 18% by weight; soap as fatty acid (e.g., oleic acid) at about 3 to 13% by weight; alkenylsuccinic acid ($C_{12}$-$C_{14}$) at about 0 to 13% by weight; aminoethanol at about 8 to 18% by weight; citric acid at about 2 to 8% by weight; phosphonate at about 0 to 3% by weight; poly alpha-1,3-glucan derivative up to about 2% by weight; other polymers (e.g., PVP, PEG) at about 0 to 3% by weight; borate at about 0 to 2% by weight; ethanol at about 0 to 3% by weight; propylene glycol at about 8 to 14% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

6) An aqueous structured liquid detergent composition comprising: linear alkylbenzenesulfonate (calculated as acid) at about 15 to 21% by weight; alcohol ethoxylate (e.g., $C_{12}$-$C_{18}$ alcohol, 7 EO; or $C_{12}$-$C_{15}$ alcohol, 5 EO) at about 3 to 9% by weight; soap as fatty acid (e.g., oleic acid) at about 3 to 10% by weight; zeolite (e.g., $NaAlSiO_4$) at about 14 to 22% by weight; potassium citrate about 9 to 18% by weight; borate at about 0 to 2% by weight; poly alpha-1,3-glucan derivative up to about 2% by weight; other polymers (e.g., PVP, PEG) at about 0 to 3% by weight; ethanol at about 0 to 3% by weight; anchoring polymers (e.g., lauryl methacrylate/acrylic acid copolymer, molar ratio 25:1, MW 3800) at about 0 to 3% by weight; glycerol at about 0 to 5% by weight; optionally an enzyme(s) (calculated as pure enzyme protein) at about 0.0001 to 0.1% by weight; and minor ingredients (e.g., dispersants, suds suppressors, perfume, optical brightener) at about 0 to 5% by weight.

7) A detergent composition formulated as a granulate having a bulk density of at least 600 g/L comprising: fatty alcohol sulfate at about 5 to 10% by weight, ethoxylated fatty acid monoethanolamide at about 3 to 9% by weight; soap as fatty acid at about 0 to 3% by weight; sodium carbonate at about 5 to 10% by weight; soluble silicate (e.g., $Na_2O$ $2SiO_2$) at about 1 to 4% by weight; zeolite (e.g., $NaAlSiO_4$) at about 20 to 40% by weight; sodium sulfate at about 2 to 8% by weight; sodium perborate at about 12 to 18% by weight; TAED at about 2 to 7% by weight; poly alpha-1,3-glucan derivative up to about 2% by weight; other polymers (e.g., maleic/acrylic acid copolymer, PEG) at about 1 to 5% by weight; optionally an enzyme(s) (calculated as pure enzyme protein) at about 0.0001 to 0.1% by weight; and minor ingredients (e.g., optical brightener, suds suppressors, perfumes) at about 0 to 5% by weight.

8) A detergent composition formulated as a granulate comprising: linear alkylbenzenesulfonate (calculated as acid) at about 8 to 14% by weight; ethoxylated fatty acid monoethanolamide at about 5 to 11% by weight; soap as fatty acid at about 0 to 3% by weight; sodium carbonate at about 4 to 10% by weight; soluble silicate (e.g., $Na_2O$ $2SiO_2$) at about 1 to 4% by weight; zeolite (e.g., $NaAlSiO_4$) at about 30 to 50% by weight; sodium sulfate at about 3 to 11% by weight; sodium citrate at about 5 to 12% by weight; poly alpha-1,3-glucan derivative up to about 2% by weight; other polymers (e.g., PVP, maleic/acrylic acid copolymer, PEG) at about 1 to 5% by weight; optionally an enzyme(s) (calculated as pure enzyme protein) at about 0.0001 to 0.1% by weight; and minor ingredients (e.g., suds suppressors, perfumes) at about 0 to 5% by weight.

9) A detergent composition formulated as a granulate comprising: linear alkylbenzenesulfonate (calculated as acid) at about 6 to 12% by weight; nonionic surfactant at about 1 to 4% by weight; soap as fatty acid at about 2 to 6% by weight; sodium carbonate at about 14 to 22% by weight; zeolite (e.g., $NaAlSiO_4$) at about 18 to 32% by weight; sodium sulfate at about 5 to 20% by weight; sodium citrate at about 3 to 8% by weight; sodium perborate at about 4 to 9% by weight; bleach activator (e.g., NOBS or TAED) at about 1 to 5% by weight; poly alpha-1,3-glucan derivative up to about 2% by weight; other polymers (e.g., polycarboxylate or PEG) at about 1 to 5% by weight; optionally an enzyme(s) (calculated as pure enzyme protein) at about 0.0001 to 0.1% by weight; and minor ingredients (e.g., optical brightener, perfume) at about 0 to 5% by weight.

10) An aqueous liquid detergent composition comprising: linear alkylbenzenesulfonate (calculated as acid) at about 15 to 23% by weight; alcohol ethoxysulfate (e.g., $C_{12}$-$C_{15}$ alcohol, 2-3 EO) at about 8 to 15% by weight; alcohol ethoxylate (e.g., $C_{12}$-$C_{15}$ alcohol, 7 EO; or $C_{12}$-$C_{15}$ alcohol, 5 EO) at about 3 to 9% by weight; soap as fatty acid (e.g., lauric acid) at about 0 to 3% by weight; aminoethanol at about 1 to 5% by weight; sodium citrate at about 5 to 10% by weight; hydrotrope (e.g., sodium toluenesulfonate) at about 2 to 6% by weight; borate at about 0 to 2% by weight; poly alpha-1,3-glucan derivative up to about 1% by weight; ethanol at about 1 to 3% by weight; propylene glycol at about 2 to 5% by weight; optionally an enzyme(s) (calculated as pure enzyme protein) at about 0.0001 to 0.1% by weight; and minor ingredients (e.g., dispersants, perfume, optical brighteners) at about 0 to 5% by weight.

11) An aqueous liquid detergent composition comprising: linear alkylbenzenesulfonate (calculated as acid) at about 20 to 32% by weight; alcohol ethoxylate (e.g., $C_{12}$-$C_{15}$ alcohol, 7 EO; or $C_{12}$-$C_{15}$ alcohol, 5 EO) at about 6 to 12% by weight; aminoethanol at about 2 to 6% by weight; citric acid at about 8 to 14% by weight; borate at about 1 to 3% by weight; poly alpha-1,3-glucan derivative up to about 2% by weight; ethanol at about 1 to 3% by weight; propylene glycol at about 2 to 5% by weight; other polymers (e.g., maleic/acrylic acid copolymer, anchoring polymer such as lauryl methacrylate/acrylic acid copolymer) at about 0 to 3% by weight; glycerol at about 3 to 8% by weight; optionally an enzyme(s) (calculated as pure enzyme protein) at about 0.0001 to 0.1% by weight; and minor ingredients (e.g., hydrotropes, dispersants, perfume, optical brighteners) at about 0 to 5% by weight.

12) A detergent composition formulated as a granulate having a bulk density of at least 600 g/L comprising: anionic surfactant (e.g., linear alkylbenzenesulfonate, alkyl sulfate, alpha-olefinsulfonate, alpha-sulfo fatty acid methyl esters, alkanesulfonates, soap) at about 25 to 40% by weight; nonionic surfactant (e.g., alcohol ethoxylate) at about 1 to 10% by weight; sodium carbonate at about 8 to 25% by weight; soluble silicate (e.g., $Na_2O$ $2SiO_2$) at about 5 to 15% by weight; sodium sulfate at about 0 to 5% by weight; zeolite ($NaAlSiO_4$) at about 15 to 28% by weight; sodium perborate at about 0 to 20% by weight; bleach activator (e.g., TAED or NOBS) at about 0 to 5% by weight; poly alpha-1,3-glucan derivative up to about 2% by weight; optionally an enzyme(s) (calculated as pure enzyme protein) at about 0.0001 to 0.1% by weight; and minor ingredients (e.g., perfume, optical brighteners) at about 0 to 3% by weight.

13) Detergent compositions as described in (1)-(12) above, but in which all or part of the linear alkylbenzenesulfonate is replaced by $C_{12}$-$C_{18}$ alkyl sulfate.

14) A detergent composition formulated as a granulate having a bulk density of at least 600 g/L comprising: $C_{12}$-$C_{18}$ alkyl sulfate at about 9 to 15% by weight; alcohol ethoxylate at about 3 to 6% by weight; polyhydroxy alkyl fatty acid amide at about 1 to 5% by weight; zeolite (e.g., $NaAlSiO_4$) at about 10 to 20% by weight; layered disilicate (e.g., SK56 from Hoechst) at about 10 to 20% by weight; sodium carbonate at about 3 to 12% by weight; soluble silicate (e.g., $Na_2O$ $2SiO_2$) at 0 to 6% by weight; sodium citrate at about 4 to 8% by weight; sodium percarbonate at about 13 to 22% by weight; TAED at about 3 to 8% by weight; poly alpha-1,3-glucan derivative up to about 2% by weight; other polymers (e.g., polycarboxylates and PVP) at about 0 to 5% by weight; optionally an enzyme(s) (calculated as pure enzyme protein) at about 0.0001 to 0.1% by weight; and minor ingredients (e.g., optical brightener, photobleach, perfume, suds suppressors) at about 0 to 5% by weight.

15) A detergent composition formulated as a granulate having a bulk density of at least 600 g/L comprising: $C_{12}$-$C_{18}$ alkyl sulfate at about 4 to 8% by weight; alcohol ethoxylate at about 11 to 15% by weight; soap at about 1 to 4% by weight; zeolite MAP or zeolite A at about 35 to 45% by weight; sodium carbonate at about 2 to 8% by weight; soluble silicate (e.g., $Na_2O$ $2SiO_2$) at 0 to 4% by weight; sodium percarbonate at about 13 to 22% by weight; TAED at about 1 to 8% by weight; poly alpha-1,3-glucan derivative up to about 3% by weight; other polymers (e.g., polycarboxylates and PVP) at about 0 to 3% by weight; optionally an enzyme(s) (calculated as pure enzyme protein) at about 0.0001 to 0.1% by weight; and minor ingredients (e.g., optical brightener, phosphonate, perfume) at about 0 to 3% by weight.

16) Detergent formulations as described in (1) to (15) above, but that contain a stabilized or encapsulated peracid, either as an additional component or as a substitute for an already specified bleach system(s).

17) Detergent compositions as described in (1), (3), (7), (9) and (12) above, but in which perborate is replaced by percarbonate.

18) Detergent compositions as described in (1), (3), (7), (9), (12), (14) and (15) above, but that additionally contain a manganese catalyst. A manganese catalyst, for example, is one of the compounds described by Hage et al. (1994, *Nature* 369:637-639), which is incorporated herein by reference.

19) Detergent compositions formulated as a non-aqueous detergent liquid comprising a liquid non-ionic surfactant, for example, a linear alkoxylated primary alcohol, a builder system (e.g., phosphate), poly α-glucan derivative, optionally an enzyme(s), and alkali. The detergent may also comprise an anionic surfactant and/or bleach system.

In other embodiments, the disclosure relates to a method of treating a substrate, for example, clothing, a fabric or a textile, the method comprising:
  i) providing a composition, wherein the composition comprises a poly alpha-1,3-glucan derivative; and
  ii) contacting the substrate with the composition; and
  iii) optionally rinsing the substrate,
wherein the poly alpha-1,3-glucan derivative is substituted with:
  a) one or more polyamine groups;
  b) one or more polyether groups; or
  c) a combination of a) and b).

In other embodiments of the above method, the substrate is a textile, a fabric, a carpet or apparel and the treatment provides a benefit to the substrate, for example, one or more of improved fabric hand, improved resistance to soil deposition, improved colorfastness, improved wear resistance, improved wrinkle resistance, improved antifungal activity, improved stain resistance, improved cleaning performance when laundered, improved drying rates, improved dye, pigment or lake update, or a combination thereof.

A fabric herein can comprise natural fibers, synthetic fibers, semi-synthetic fibers, or any combination thereof. A semi-synthetic fiber herein is produced using naturally occurring material that has been chemically derivatized, an example of which is rayon. Non-limiting examples of fabric types herein include fabrics made of (i) cellulosic fibers such as cotton (e.g., broadcloth, canvas, chambray, chenille, chintz, corduroy, cretonne, damask, denim, flannel, gingham, jacquard, knit, matelassé, oxford, percale, poplin, plissé, sateen, seersucker, sheers, terry cloth, twill, velvet), rayon (e.g., viscose, modal, lyocell), linen, and TENCEL®; (ii) proteinaceous fibers such as silk, wool and related mammalian fibers; (iii) synthetic fibers such as polyester, acrylic, nylon, and the like; (iv) long vegetable fibers from jute, flax, ramie, coir, kapok, sisal, henequen, abaca, hemp and sunn; and (v) any combination of a fabric of (i)-(iv). Fabric comprising a combination of fiber types (e.g., natural and synthetic) include those with both a cotton fiber and polyester, for example. Materials/articles containing one or more fabrics herein include, for example, clothing, curtains, drapes, upholstery, carpeting, bed linens, bath linens, tablecloths, sleeping bags, tents, car interiors, etc. Other materials comprising natural and/or synthetic fibers include, for example, non-woven fabrics, paddings, paper, and foams.

The step of contacting can be performed at a variety of conditions, for example, times, temperatures, wash/rinse volumes. Methods for contacting a fabric or textile substrate, for example, a fabric care method or laundry method are generally well known. For example, a material comprising fabric can be contacted with the disclosed composition: (i) for at least about 5, 10, 20, 30, 40, 50, 60, 70, 80, 90, 100, 110, or 120 minutes; (ii) at a temperature of at least about 10, 15, 20, 25, 30, 35, 40, 45, 50, 55, 60, 65, 70, 75, 80, 85, 90, or 95° C. (e.g., for laundry wash or rinse: a "cold" temperature of about 15-30° C., a "warm" temperature of about 30-50° C., a "hot" temperature of about 50-95° C.); (iii) at a pH of about 2, 3, 4, 5, 6, 7, 8, 9, 10, 11, or 12 (e.g., pH range of about 2-12, or about 3-11); (iv) at a salt (e.g., NaCl) concentration of at least about 0.5, 1.0, 1.5, 2.0, 2.5, 3.0, 3.5, or 4.0% by weight; or any combination of (i)-(iv). The contacting step in a fabric care method or laundry method can comprise any of washing, soaking, and/or rinsing steps, for example. In some embodiments, the rinsing step is a step of rinsing with water.

Other substrates that can be contacted include, for example, surfaces that can be treated with a dish detergent (e.g., automatic dishwashing detergent or hand dish detergent). Examples of such materials include surfaces of dishes, glasses, pots, pans, baking dishes, utensils and flatware made from ceramic material, china, metal, glass, plastic (e.g., polyethylene, polypropylene, polystyrene, etc.) and wood (collectively referred to herein as "tableware"). Examples of conditions (e.g., time, temperature, wash volume) for conducting a dishwashing or tableware washing method are known in the art. In other examples, a tableware article can be contacted with the composition herein under a suitable set of conditions such as any of those disclosed above with regard to contacting a fabric-comprising material.

Certain embodiments of a method of treating a substrate further comprise a drying step, in which a material is dried after being contacted with the composition. The drying step can be performed directly after the contacting step, or following one or more additional steps that might follow the contacting step, for example, drying of a fabric after being rinsed, in water for example, following a wash in an aqueous composition. Drying can be performed by any of several means known in the art, such as air drying at a temperature of at least about 30, 40, 50, 60, 70, 80, 90, 100, 120, 140, 160, 170, 175, 180, or 200° C., for example. A material that has been dried herein typically has less than 3, 2, 1, 0.5, or 0.1 wt % water comprised therein.

Non-limiting examples of the embodiments disclosed herein include:

1. A composition comprising a poly alpha-1,3-glucan derivative wherein the poly alpha-1,3-glucan derivative comprises poly alpha-1,3-glucan substituted with:
  a) one or more polyamine groups;
  b) one or more polyether groups; or
  c) a combination of a) and b).

2. The composition of embodiment 1 wherein the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

3. The composition of any one of embodiments 1 or 2 in the form of a liquid, a gel, a powder, a hydrocolloid, an aqueous solution, a granule, a tablet, a capsule, a single compartment sachet, or a multi-compartment sachet.

4. The composition of any one of embodiments 1, 2 or 3 wherein the poly alpha-1,3-glucan comprises a backbone of glucose monomer units wherein greater than or equal to 50% of the glucose monomer units are linked via alpha-1,3-glycosidic linkages.

5. The composition of any one of embodiments 1, 2, 3 or 4 wherein the poly alpha-1,3-glucan comprises a backbone of glucose monomer units wherein greater than or equal to 90% of the glucose monomer units are linked via alpha-1,3-glycosidic linkages.

6. The composition of any one of embodiments 1, 2, 3, 4 or 5 wherein the one or more polyether groups have a repeat unit according to (—$CH_2CH_2O$—), (—$CH_2CH(CH_3)O$—), or a combination thereof.

7. The composition of any one of embodiments 1, 2, 3, 4, 5 or 6 wherein the one or more polyamine groups have a repeat unit according to (($CH_2)_y$NH), wherein y is from 2 to 6 inclusive.

8. The composition of any one of embodiments 1, 2, 3, 4, 5, 6 or 7 wherein the polyether has a degree of polymerization in the range of from 2 to 100.

9. The composition of any one of embodiments 1, 2, 3, 4, 5, 6, 7, or 8 wherein the one or more polyamine groups is a linear polyamine, a branched polyamine, or a dendritic polyamine.

10. The composition of any one of embodiments 1, 2, 3, 4, 5, 6, 7, 8, or 9 wherein the at least one polyamine group is terminated with one or more polyether groups.

11. The composition of any one of embodiments 1, 2, 3, 4, 5, 6, 7, 8, 9, or 10 wherein the poly alpha-1,3-glucan derivative comprises poly alpha-1,3-glucan substituted with —$CH_2OCH_2CH(OH)CH_2NH(CH_2)_{2-6}NH(CH_2CH(CH_3)O)_{2-100}H$, and/or —$CH_2OCH_2CH(OH)CH_2NH$—$R^7$—(N($R^5$)—$R^7)_{0-12}$—$NH(CH_2CH_2O)_{2-100}H$.

12. The composition of any one of embodiments 1, 2, 3, 4, 5, 6, 7, 8, 9, or 10 wherein the one or more polyamine groups comprise a radical represented by Structure 3c:

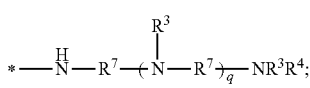

Structure 3c wherein
each $R^3$ or $R^4$ is independently hydrogen, $C_1$ to $C_{12}$ alkyl, (—$R^7O$—)$_x$H, a polyamine, or (—$R^7$—$NR^5)_q R^6$;
each $R^5$ or $R^6$ is independently hydrogen, $R^8$, or (—$R^7O$—)$_x$H;
each $R^7$ is independently a $C_1$ to $C_{12}$ alkylene, optionally substituted with hydroxyl;
$R^8$ is independently hydrogen, a $C_1$ to $C_{12}$ alkyl, or a cation;
each x is independently 2 to 100; and
each q is independently 0 to 12.

13. The composition of any one of embodiments 1, 2, 3, 4, 5, 6, 7, 8, 9, or 10 wherein the one or more polyamine groups comprise a radical represented by Structure 3g:

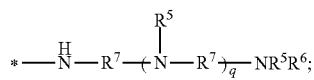

Structure 3g wherein
each $R^5$ or $R^6$ is independently hydrogen, $R^8$, or (—$R^7O$—)$_x$H;
each $R^7$ is independently a $C_1$ to $C_{12}$ alkylene, optionally substituted with hydroxyl;
each $R^8$ is independently hydrogen, $C_1$ to $C_{12}$ alkyl, or a cation; and
each x is independently 2 to 100.

14. The composition of any one of embodiments 1, 2, 3, 4, 5, 6, 7, 8, 9, 10, 11, 12, or 13 wherein the enzyme comprises at least one protease.

15. A method for treating a substrate comprising:
  i) providing a composition, wherein the composition comprises a poly alpha-1,3-glucan derivative; and
  ii) contacting the substrate with the composition; and
  iii) optionally rinsing the substrate,
wherein the poly alpha-1,3-glucan derivative is a poly alpha-1,3-glucan substituted with:
  a) one or more polyamine groups;
  b) one or more polyether groups; or
  c) a combination of a) and b).

16. The method of embodiment 15 wherein the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

17. The method of any one of embodiments 15 or 16 wherein the composition is in the form of a liquid, a gel, a powder, a hydrocolloid, an aqueous solution, a granule, a tablet, a capsule, a single compartment sachet, or a multi-compartment sachet.

18. The method of any one of embodiments 15, 16, or 17 wherein the poly alpha-1,3-glucan comprises a backbone of glucose monomer units wherein greater than or equal to 50% of the glucose monomer units are linked via alpha-1,3-glycosidic linkages.

19. The method of any one of embodiments 15, 16, 17, or 18 wherein the one or more polyether groups have a repeat unit according to (—$CH_2CH_2O$—), (—$CH_2CH(CH_3)O$—), or a combination thereof.

20. The method of any one of embodiments 15, 16, 17, 18, or 19 wherein the one or more polyamines have a repeat unit of (($CH_2)_y$NH) wherein y is from 2 to 6 inclusive.

21. The method of any one of embodiments 15, 16, 17, 18, 19, or 20 further comprising the step of rinsing the substrate.

22. A substrate treated with a composition comprising a poly alpha-1,3-glucan derivative, wherein the poly alpha-1,3-glucan derivative is a poly alpha-1,3-glucan substituted with:

a) one or more polyamine groups;
b) one or more polyether groups; or
c) a combination of a) and b).

23. The treated substrate of embodiment 21, wherein the composition is any one of embodiments 2, 3, 4, 5, 6, 7, 8, 9, 10, 11, 12, 13, or 14.

EXAMPLES

Preparation of Poly Alpha-1,3-Glucan Wet Cake

Poly alpha-1,3-glucan was prepared using a gtfJ enzyme preparation as described in U.S. Patent Appl. Publ. No. 2013/0244288, now U.S. Pat. No. 9,080,195, both of which are incorporated herein by reference in their entirety. In a representative preparation, poly alpha-1,3-glucan was prepared from an aqueous solution (0.5 L) containing *Streptococcus salivarius* gtfJ enzyme (100 unit/L), sucrose (100 g/L) obtained from OmniPur Sucrose (EM8550), potassium phosphate buffer (10 mM) obtained from Sigma Aldrich, and FERMASURE®, an antimicrobial agent, (100 ppm) obtained from DuPont adjusted to pH 5.5. The resulting enzyme reaction solution was maintained at 20-25° C. for 24 hours. A slurry was formed since the poly alpha-1,3-glucan synthesized in the reaction was aqueous insoluble. The poly alpha-1,3-glucan solids produced in the reaction were collected using a Buchner funnel fitted with a 325-mesh screen over 40 micrometer filter paper, forming the wet cake which contained about 60% by weight of water.

Example 1—Cyanoethylation of Poly Alpha-1,3-Glucan

A 4-neck, 250 milliliters (ml) round bottom flask containing a mechanical stir rod, thermocouple and addition funnel is charged with 25.0 grams (g) of poly alpha-1,3-glucan wet cake and 67 ml of water. The mixture is stirred at room temperature while 7 g of 50 wt % sodium hydroxide solution is added over a 5-minute period. The resulting mixture is stirred at room temperature for 1 hour. Acrylonitrile (12.9 ml) is added drop-wise at room temperature. The resulting mixture is stirred at room temperature for 5 hours. The precipitated solid is collected by filtering followed by washing with water until pH about 7, drying in air overnight, then in 80° C. vacuum oven for 6 hours to get a white solid, cyanoethylate glucan (CEG).

Example 2—Reduction of Cyanoethyl Glucan (CEG)

The cyanoethylated glucan from Example 1 (1 g) and cobaltous chloride hexahydrate (4 equivalents with respect to cyanoethyl groups) are dissolved in 20 mL water and sodium borohydrate (15 equivalents per cyano groups) is added in portions with stirring at 20° C. The reaction is stirred for 1 hour at room temperature. The precipitate is removed by filtration. The filtrate is purified by membrane ultrafiltration to yield aminated poly alpha-1,3-glucan.

Example 3—Amination of Poly Alpha-1,3-Glucan 10 g of the poly α-1,3-glucan wet cake is added to 60 mL of isopropanol in a 250 mL capacity round bottom flask fitted with a thermocouple, a mechanical stirring rod, and additional funnel. NaOH aqueous solution (13.5 mL of 50% aqueous solution) is added. The mixture is stirred at room temperature for 30 minutes and is then heated at 55° C. for one hour. Ethyl chloroacetate (22 ml) is then added drop wise. The reaction is kept at 55° C. for 1.5 hrs.

After that, ethylenediamine (10.8 g) is added drop wise to the above resulting mixture. The reaction is kept at 55° C. for 1.5 hours before being neutralized by 90% acetic acid. The product is collected by vacuum filtration and is washed with methanol (95%) four times and dried under vacuum at 50° C.

Example 4—Amination of Poly Alpha-1,3-Glucan 10 g of the poly α-1,3-glucan wet cake is added to 60 mL of isopropanol in a 250 mL capacity round bottom flask fitted with a thermocouple, a mechanical stirring rod, and additional funnel. NaOH aqueous solution (13.5 g of 50% aqueous solution) is added. The mixture is stirred at room temperature for 30 minutes and is then heated at 55° C. for one hour. Ethyl acrylate (10 g) is then added drop wise. The reaction is kept at 55° C. for 1.5 hrs.

Ethylenediamine (10.8 g) is added drop wise to the above resulting mixture. The reaction is kept at 55° C. for 1.5 hours before being neutralized by 90% acetic acid. The product is collected by vacuum filtration and is washed with methanol (95%) four times, dried under vacuum at 50° C.

Example 5—Oxidized Poly Alpha-1,3-Glucan 10 g Poly alpha-1,3-glucan wet cake is suspended in 10 mL water, and cooled to −10° C. To this is added a solution of 4-acetamido-TEMPO (0.25g) and sodium bromide (0.33g) in 20 mL water. 1.32g of 50% sodium hydroxide solution is added to the reaction mixture followed by 20.7g of 12 wt % sodium hypochlorite solution. The reaction mixture is stirred at −4° C. for 1 hour. The reaction mixture is then added into a stirring methanol solution (3× volume). The precipitate is collected and washed with 50% aqueous ethanol (4×), dried under a stream of nitrogen for 30 min, then dried at 40° C. overnight in a vacuum oven to yield white product that is oxidized poly alpha-1,3-glucan (carboxylate form).

Example 6—Amination of Poly Alpha-1,3-Glucan Carboxylate 1g of oxidized poly alpha-1,3-glucan from example 5 is dissolved in 50 mL water. To this is added 4g ethylene diamine, followed by 10 g EDC (1-ethyl-3-(3-dimethylaminopropyl)carbodiimide hydrochloride). The mixture is stirred at room temperature for 12 hours. The product is isolated by membrane filtration (MWCO 10 kD).

Example 7—Tosylation of Poly Alpha-1,3-Glucan 5g of poly alpha-1,3-glucan is dissolved in 100 mL of dimethylacetamide (DMAc) containing 8g of anhydrous lithium chloride (LiCl). To the dissolved solution is added 14 mL of triethylamine and 10 mL of DMAc. The mixture is cooled to 8° C. and a solution of 10 g of p-toluenesulfonyl chloride in 15 mL DMAc dropwise over 30 min. The mixture is stirred for 24 hrs at 8° C. The solution is poured into 1 L of ice water to precipitate the product. The precipitated is collected, washed with 3 L of water and 500 mL ethanol, and suspended in 500 mL acetone, and re-precipitated into 1 L of water. The precipitate is washed with ethanol, and dried.

Example 8—Amination of Poly Alpha-1,3-Glucan Tosylate

1 Gram of poly alpha-1,3-glucan tosylate from Example 7 is dissolved in 10 mL dimethyl sulfoxide (DMSO). To this is added 4g ethylene diamine. The mixture is heated to 70° C. for 6 h. The mixture is cooled, and poured into 100 mL of ethanol. The precipitate is collected and washed with 70% aqueous methanol.

Example 9—Oxidation of Poly Alpha-1,3-Glucan

Poly alpha-1,3-glucan wet cake is added to 170 mL of distilled water in a 500 ml round bottom flask. The mixture is stirred for 15 to 30 minutes to produce a solution. 17.7 g of sodium periodate in 160 mL distilled water is added to the solution all at once. The mixture is stirred at room temperature for 5 hours. After this time, the solution is removed from the round bottom flask, divided into four equal volumes and dispensed into 4 dialysis membrane tubes (MWCO=3500 Daltons). Each tube is dialyzed in deionized water for 4 days, during which time the water is changed twice daily. The aqueous solutions can be removed from the dialysis tubes, placed in wide-mouth polyethylene containers and frozen using liquid nitrogen, and lyophilized to afford poly alpha-1,3-glucan aldehyde.

Example 10—Amination of Poly Alpha-1,3-Glucan Aldehyde 5 g of the poly alpha-1,3-glucan aldehyde from Example 9 is dissolved in 500 mL 0.1M borate buffer, pH 11. The aldehyde solution is added slowly over 5 hours to a basic solution of hexamethylene diamine in about 300 mL of distilled water. The mixture is stirred at room temperature for 24 hours. Sodium borohydride (4.14 g) is added, the reaction is stirred for 24 hours. The reduction is repeated with another addition of 4.14 g of sodium borohydride, with stirring for another 24 hours. The resulting solution is dialyzed in distilled water (3500 MWCO) for 2 days, with 2 water exchanges, then lyophilized to dryness.

Example 11—Tosylation of Poly Alpha-1,3-Glucan

The procedure used was similar to a synthetic route given in the literature (Green Chem., 2014, 16, 1941). NaOH (35 g, 50% concentration), urea (30 gram), and water (166.5 mL) were mixed and stirred to get a clear solution. Poly alpha-1,3-glucan wet cake (dp 800, 26 g, 38% solid) was added with stirring. The mixture was cooled to −12° C. for 1 hour with acetone-dry ice bath and stirred vigorously at ambient temperature to obtain the transparent glucan solution. To the above glucan solution cooled to 10° C. by ice-bath, p-toluenesulfonyl chloride (0.28 mol, 53 gram) and polyethylene glycol alkyl ($C_{11}$-$C_{15}$) ether (20 mL) were added. The mixture was stirred vigorously at 0° C. for at least 3 hours and warmed up to room temperature overnight. The solid was precipitated with 500 mL 80% (v/v) methanol. The product was separated by filtration, washed three times with methanol (50 mL/each) and isopropanol (50 mL/each), dried under vacuum at 50° C. to afford 22.4 gram of white solid. The product was characterized by $^{13}$C NMR. $^{13}$C (500 MHz, DMSO-$d_6$, ppm): 144.6, 132.3, 129.9, 127.6, 99.3, 81.7, 71.7-69.4, 60.1, 21.1;

Example 12—Amination of Glucan Tosylate

The procedure used was similar to a synthetic route given in the literature (Green Chem., 2014, 16, 1941-1946). To the glucan toslylate of Example 11, (2 gram) in a vial (25 mL), N,N-diethylethylenediamine (4.2 mL, 30 mmol) was added at room temperature. DMSO (1 mL) was then added. The reaction mixture was stirred at 100° C. overnight. The mixture was cooled and neutralized to pH 5-7 using 5M HCl aqueous solution, poured into acetone (100 mL), the bottom layer was collected and precipitated with methanol (150 mL), and washed with methanol/acetone (10/90) three times to afford 0.63 gram of the product. Based on NMR analysis, the product contained both amine and tosyl groups. $^{13}$C (500 MHz, DMSO-$d_6$, ppm): 145.2, 132.3, 130.1, 128.1, 99.8, 82.7, 72.1-69.5, 60.3, 48.4, 46.5, 21.1, 9.8.

Example 13—Polyhydroxypropyl Ether Glucan

300 Grams of poly alpha-1,3-glucan was suspended in a mixture of 950 g toluene and 250 g tert-butanol and charged into an autoclave vessel. The vessel was closed and flushed with $N_2$. 120 g of a 25% caustic soda solution (30 g NaOH+90 g water) was added while stirring (120 rpm). The reactor was stirred for 45 min at room temperature. Propylene oxide (1074g) was added and the reaction mixture was stirred for 1 h at 75° C., 1 h at 85° C. and finally for 3 h at 95° C. While cooling down, 45 g acetic acid was added and the mixture was stirred for another 30 min. The solvent was removed under vacuum. The product was washed with hot water and dried in vacuum at 50° C.

Example 14—Cyanoethylation of Poly Alpha-1,3-Glucan

A 4-neck, 1 L round bottom flask containing a mechanical stir rod, thermocouple and addition funnel was charged with 260 g of poly alpha-1,3-glucan wet cake (100 g glucan and 160 g water) and 550 g of water. The mixture was stirred at room temperature while 64 g of 50 wt % sodium hydroxide solution was added over a 15-minute period. The polymer was almost completely dissolved after being stirred 30 min at room temperature. Acrylonitrile (64 g) was added dropwise at 25° C. in 10 minutes. The mixture was stirred at room temperature. At 30 minutes after the start of acrylonitrile addition, the internal temperature was 30° C. At 1.5 hour after the start of acrylonitrile addition, the internal temperature was 35° C. At 2.5 hours after the start of acrylonitrile addition, the internal temperature was 34° C. The mixture was stirred at room temperature for another hour, then cooled to 20° C. HCl (18.5 wt %) was used to bring the pH of the mixture to about 7. The mixture was set at room temperature overnight. A very viscous solution with brown color was observed. This solution was poured in to methanol (7.5 L) and a solid was precipitated. The solid was collected by filtration and washed with 95 wt % methanol (1.5 L) in a blender. The washed solid was collected by filtration, and dried under vacuum to give an off-white solid (cyanoethyl poly alpha-1,3-glucan, 124.1 g). NMR indicated the solid had DoS (CN)=0.88, DoS (amide)=0.04, and DoS (acid)=0.15.

Example 15—Amidoxime Poly Alpha-1,3-Glucan

A 500 mL three-necked round-bottomed flask was equipped with a mechanical stirrer, condenser, and addition funnel under nitrogen. cyanoethyl poly alpha-1,3-glucan (20.0 g, from Example 14) and water (200 mL) were added to the flask and stirred. In a separate 100 mL Erlenmeyer flask, hydroxylamine hydrochloride (8.2 g) was dissolved in water (50 mL) and then treated with sodium hydroxide (9.0 g. 50% solution). The hydroxylamine solution was then added in one portion directly to the mixture in the round-bottomed flask at room temperature. The mixture was stirred and heated at 80° C. for 6 hr. An almost homogeneous solution was obtained by the end of the reaction. After being cooled to room temperature, MeOH (200 mL) was added to the reaction mixture. The mixture was then poured into MeOH (1 L). The precipitated solid was collected by filtration and washed with methanol (80 v %, 2×300 mL), dried on vacuum at 35° C. overnight to give a white solid (Amidoxime poly alpha-1,3-glucan, 21.5 g). NMR indicated that about 90% of nitrile functional group was converted into amidoxime group.

Example 16—Oxidation of Poly Alpha-1,3-Glucan 10 g Poly alpha-1,3-glucan wet cake (43% solid) was blended to make a finer powder. 4-acetamido-TEMPO (1.1 g) and sodium bromide (1.1 g) were dissolved in 20 mL water. The glucan was suspended in 10 mL water and cooled to −4° C. To this was added the TEMPO/NaBr solution. To this was added 4.4 g of 50% sodium hydroxide solution followed by sodium hypochlorite solution (69 g of 12 wt % solution). The mixture was stirred at −4° C. for 1 hour. The mixture was precipitated (3× volume) into methanol, and washed with (4×) 50% aqueous ethanol, dried under $N_2$, and dried at 40 C overnight in the vacuum oven under a stream of $N_2$ to afford oxidized glucan (carboxylate form).

Example 17—Oxidation of Poly Alpha-1,3-Glucan 10 g Poly alpha-1,3-glucan wet cake (43 wt %) is suspended in 170 mL of distilled water in a 500 mL round bottom flask. To this is added sodium bromide (2.6 g) and sodium phosphate (39 g). The pH is adjusted to 9. The solution is cooled to 5° C. and 4-acetomido-TEMPO (53 mg) dissolved in 1 mL water is added. Sodium hypochlorite (25 mol % to hydroxyl mol) is added. The mixture is stirred at 5° C. for 15 min. The solution is dialyzed (MWCO=3500 Daltons) for 4 days, during which time the water is changed twice daily. The aqueous solutions is lyophilized to afford poly alpha-1,3-glucan aldehyde.

What is claimed is:

1. A composition comprising a poly alpha-1,3-glucan derivative, wherein the poly alpha-1,3-glucan derivative comprises poly alpha-1,3-glucan substituted with one or more polyamine groups.

2. The composition of claim 1, wherein the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

3. The composition of claim 1, in the form of a liquid, a gel, a powder, a hydrocolloid, an aqueous solution, a granule, a tablet, a capsule, a single compartment sachet, or a multi-compartment sachet.

4. The composition of claim 1, wherein the poly alpha-1,3-glucan comprises a backbone of glucose monomer units of which greater than or equal to 50% of the glucose monomer units are linked via alpha-1,3-glycosidic linkages.

5. The composition of claim 4, wherein greater than or equal to 90% of the glucose monomer units are linked via alpha-1,3-glycosidic linkages.

6. The composition of claim 1, wherein the one or more polyamine groups have a repeat unit according to $((CH_2)_y NH)$, wherein y is 2 to 6 inclusive.

7. The composition of claim 1, wherein the one or more polyamine groups is a linear polyamine, a branched polyamine, or a dendritic polyamine.

8. The composition of claim 1, wherein the one or more polyamine groups comprise a radical represented by Structure 3c:

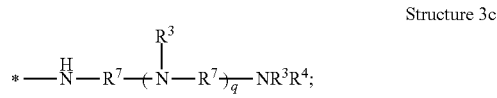

Structure 3c wherein
each $R^3$ or $R^4$ is independently hydrogen, $C_1$ to $C_{12}$ alkyl, $(-R^7O-)_xH$, a polyamine, or $(-R^7-NR^5)_qR^6$;
each $R^5$ or $R^6$ is independently hydrogen, $R^8$, or $(-R^7O-)_xH$;
each $R^7$ is independently a $C_1$ to $C_{12}$ alkylene, optionally substituted with hydroxyl;
$R^8$ is independently hydrogen, a $C_1$ to $C_{12}$ alkyl, or a cation;
each x is independently 2 to 100; and
each q is independently 0 to 12.

9. The composition of claim 1, wherein the one or more polyamine groups comprise a radical represented by Structure 3g:

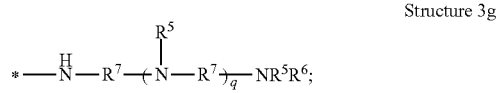

Structure 3g wherein
each $R^5$ or $R^6$ is independently hydrogen, $R^8$, or $(-R^7O-)_xH$;
each $R^7$ is independently a $C_1$ to $C_{12}$ alkylene, optionally substituted with hydroxyl;
each $R^8$ is independently hydrogen, $C_1$ to $C_{12}$ alkyl, or a cation;
each x is independently 2 to 100; and
each q is independently 0 to 12.

10. The composition of claim 2, wherein the enzyme comprises at least one protease.

11. A method for treating a substrate comprising:
(i) providing a composition, wherein the composition comprises a poly alpha-1,3-glucan derivative; and
(ii) contacting the substrate with the composition;
wherein the poly alpha-1,3-glucan derivative is a poly alpha-1,3-glucan substituted with one or more polyamine groups.

12. The method of claim 11, wherein the composition further comprises at least one of a surfactant, an enzyme, a detergent builder, a complexing agent, a polymer, a soil release polymer, a surfactancy-boosting polymer, a bleaching agent, a bleach activator, a bleaching catalyst, a fabric conditioner, a clay, a foam booster, a suds suppressor, an anti-corrosion agent, a soil-suspending agent, an anti-soil redeposition agent, a dye, a bactericide, a tarnish inhibitor, an optical brightener, a perfume, a saturated or unsaturated fatty acid, a dye transfer inhibiting agent, a chelating agent, a hueing dye, a calcium cation, a magnesium cation, a visual signaling ingredient, an anti-foam, a structurant, a thickener, an anti-caking agent, a starch, sand, a gelling agent, or a combination thereof.

13. The method of claim 11, wherein the composition is in the form of a liquid, a gel, a powder, a hydrocolloid, an aqueous solution, a granule, a tablet, a capsule, a single compartment sachet, or a multi-compartment sachet.

14. The method of claim 11, wherein the poly alpha-1,3-glucan comprises a backbone of glucose monomer units of which greater than or equal to 50% of the glucose monomer units are linked via alpha-1,3-glycosidic linkages.

15. The method of claim 14, wherein greater than or equal to 90% of the glucose monomer units are linked via alpha-1,3-glycosidic linkages.

16. The method of claim 11, wherein the one or more polyamines have a repeat unit of $((CH_2)_y NH)$, wherein y is 2 to 6 inclusive.

17. The method of claim 11, further comprising a step of (iii) rinsing the substrate.

18. The method of claim 11, wherein the one or more polyamine groups comprise a radical represented by Structure 3c:

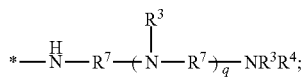

Structure 3c wherein
each $R^3$ or $R^4$ is independently hydrogen, $C_1$ to $C_{12}$ alkyl, $(-R^7O-)_xH$, a polyamine, or $(-R^7-NR^5)_qR^6$;
each $R^5$ or $R^6$ is independently hydrogen, $R^8$, or $(-R^7O-)_xH$;
each $R^7$ is independently a $C_1$ to $C_{12}$ alkylene, optionally substituted with hydroxyl;
$R^8$ is independently hydrogen, a $C_1$ to $C_{12}$ alkyl, or a cation;
each x is independently 2 to 100; and
each q is independently 0 to 12.

19. The method of claim 11, wherein the one or more polyamine groups comprise a radical represented by Structure 3g:

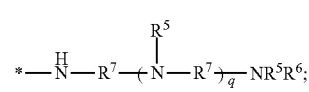

Structure 3g wherein
each $R^5$ or $R^6$ is independently hydrogen, $R^8$, or $(-R^7O-)_xH$;
each $R^7$ is independently a $C_1$ to $C_{12}$ alkylene, optionally substituted with hydroxyl;
each $R^8$ is independently hydrogen, $C_1$ to $C_{12}$ alkyl, or a cation;
each x is independently 2 to 100; and
each q is independently 0 to 12.

* * * * *